(12) United States Patent
Sawada

(10) Patent No.: US 12,409,833 B2
(45) Date of Patent: Sep. 9, 2025

(54) CLUTCH DEVICE AND COLLISION MITIGATION MECHANISM

(71) Applicant: Fukuei Sawada, Tokorozawa (JP)

(72) Inventor: Fukuei Sawada, Tokorozawa (JP)

( * ) Notice: Subject to any disclaimer, the term of this patent is extended or adjusted under 35 U.S.C. 154(b) by 442 days.

(21) Appl. No.: 17/463,884

(22) Filed: Sep. 1, 2021

(65) Prior Publication Data

US 2022/0073061 A1 Mar. 10, 2022

(30) Foreign Application Priority Data

Sep. 4, 2020 (JP) ................................. 2020-149490

(51) Int. Cl.
*B60W 30/09* (2012.01)
*B60K 6/38* (2007.10)
(Continued)

(52) U.S. Cl.
CPC ............... *B60W 30/09* (2013.01); *B60L 7/10* (2013.01); *B60W 10/02* (2013.01); *B60W 10/08* (2013.01);
(Continued)

(58) Field of Classification Search
CPC ...... B60W 10/02; B60W 10/08; B60W 20/00; B60W 2030/082; B60W 2520/10;
(Continued)

(56) References Cited

U.S. PATENT DOCUMENTS 5,013,949 A * 5/1991 Mabe, Jr. ............. H02K 49/102
310/83
5,456,345 A * 10/1995 Bissett ................... F16D 13/757
192/70.252
(Continued)

FOREIGN PATENT DOCUMENTS

JP  2001-82507 A  3/2001
JP  2005163936 A * 6/2005
(Continued)

OTHER PUBLICATIONS

Japan Patent Office, "Office Action for Japanese Patent Application No. 2020-149490," Dec. 21, 2020.
(Continued)

*Primary Examiner* — Aniss Chad
*Assistant Examiner* — Christine Nguyen Huynh
(74) *Attorney, Agent, or Firm* — HAUPTMAN HAM, LLP

(57) ABSTRACT

When a collision occurs, a driving force of a drive shaft is transmitted to a reversing high-load multiple disk clutch via an inertia absorbing gear mechanism. Then, the driving force is transmitted to a gear via a gear, and inertia is absorbed and the driving force acts to rotate an output shaft at a low speed. On the other hand, when the gear rotates, a regenerative/backing up motor also rotates, and so-called regenerative driving is also performed. Due to these operations, the output shaft rapidly decreases in rotation speed, and goes into a rotation stopping state from a forward rotating state. Then, when a vehicle speed sensor detects that the vehicle speed has reached "0," the regenerative/backing up motor is driven, the output shaft is driven to rotate reversely for several seconds, and thereafter, driving of the regenerative/backing up motor is stopped.

11 Claims, 20 Drawing Sheets

(51) Int. Cl.
  *B60L 7/10* (2006.01)
  *B60W 10/02* (2006.01)
  *B60W 10/08* (2006.01)
  *B60W 30/18* (2012.01)
  *B60K 6/26* (2007.10)
  *B60W 20/00* (2016.01)

(52) U.S. Cl.
  CPC ......... *B60W 30/18054* (2013.01); *B60K 6/26* (2013.01); *B60K 6/38* (2013.01); *B60W 20/00* (2013.01); *B60W 2520/10* (2013.01); *B60W 2520/12* (2013.01); *B60W 2540/10* (2013.01); *B60W 2540/12* (2013.01); *B60W 2540/16* (2013.01); *B60W 2540/18* (2013.01); *B60W 2552/15* (2020.02); *B60W 2710/022* (2013.01); *B60W 2710/083* (2013.01); *B60W 2720/10* (2013.01); *B60W 2720/24* (2013.01); *B60Y 2200/92* (2013.01); *B60Y 2300/09* (2013.01); *B60Y 2300/42* (2013.01)

(58) Field of Classification Search
  CPC ......... B60W 2520/12; B60W 2540/10; B60W 2540/12; B60W 2540/16; B60W 2540/18; B60W 2552/15; B60W 2554/00; B60W 2554/802; B60W 2710/022; B60W 2710/083; B60W 2720/10; B60W 2720/24; B60W 30/08; B60W 30/09; B60W 30/18036; B60W 30/18054; B60W 50/12; B60K 2006/541; B60K 6/26; B60K 6/38; B60K 6/387; B60L 15/2009; B60L 15/2054; B60L 2240/507; B60L 3/0007; B60L 7/10; B60Y 2200/92; B60Y 2300/09; B60Y 2300/42; B60Y 2302/05; F16D 2023/126; F16D 2023/0643; F16D 2023/065; H02K 49/102; Y02T 10/64; Y02T 10/72

See application file for complete search history.

(56) References Cited

U.S. PATENT DOCUMENTS

| | | | |
|---|---|---|---|
| 6,005,317 | A | 12/1999 | Lamb |
| 2002/0132670 | A1* | 9/2002 | Killen ................. H02K 49/046 |
| | | | 464/29 |
| 2013/0054103 | A1* | 2/2013 | Herink ...................... B60T 7/22 |
| | | | 701/65 |
| 2016/0036311 | A1 | 2/2016 | Lee |
| 2016/0272187 | A1* | 9/2016 | Yukawa .................. B60K 6/26 |
| 2019/0032731 | A1* | 1/2019 | Eo ........................... F16D 23/02 |
| 2019/0039597 | A1* | 2/2019 | Hawley ........... B60W 30/18127 |

FOREIGN PATENT DOCUMENTS

| | | | |
|---|---|---|---|
| JP | 2005-264982 A | 9/2005 | |
| JP | 2007-85477 A | 4/2007 | |
| JP | 2012-145143 A | 8/2012 | |
| JP | 2014-109375 A | 6/2014 | |
| JP | 2016-118238 A | 6/2016 | |
| JP | 2017-128167 A | 7/2017 | |
| WO | WO-2008085931 A2 * | 7/2008 | ........... H02K 49/102 |

OTHER PUBLICATIONS

Extended European Search Report for European Application No. 24190836.7 dated Oct. 31, 2024; 8 pp.

* cited by examiner

CLUTCH DEVICE AND COLLISION MITIGATION MECHANISM

TECHNICAL FIELD

The present invention relates to a clutch device and a collision mitigation mechanism for a vehicle such as an automobile.

BACKGROUND ART

In a conventional automobile, a driving force of an engine is transmitted from the engine to a transmission via a mechanical or electrical clutch and a torque converter. For example, Patent Document 1 listed below discloses an electromagnetic clutch configured to be more compact than a conventional clutch by reducing a magnetic resistance in a magnetic path by filling a magnetic fluid between a field core and a drive pulley.

CITATION LIST

Patent Document

[Patent Document 1] Japanese Published Unexamined Patent Application No. 2014-109375

SUMMARY OF INVENTION

Technical Problem

Nowadays, there is strong demand for improvement in fuel efficiency and environmental measures, and hybrid type and electric-motor driven automobiles are being researched and developed. However, a hybrid type uses both of a gasoline engine and an electric motor, so that its structure and control are extremely complicated. On the other hand, in an electric-motor driven automobile, there is a need for further research into power storage capacity and charging method of batteries, and there are challenges involving the building up of charging facilities.

On the other hand, accidents caused by mistakes in stepping on an accelerator pedal instead of a brake pedal have increased. Of course, it would be best to prevent such accidents, but as a next best solution, mitigation of damage from such an accident when an accident occurs is advantageous.

The present invention has been made in view of these considerations, and an object thereof is to realize effective use of energy, an improvement in fuel efficiency, and reduction in environmental load. Another object is to mitigate damage from a collision.

Solution to Problem

The present invention provides a collision mitigation mechanism which mitigates damage from a vehicle collision, including a collision detection means that detects a collision of a vehicle, a clutch means that blocks transmission of a driving force of a drive source when a collision is detected by the collision detection means, a deceleration and stop means that rapidly decelerates and stops the vehicle, a backing up means that backs up and stops the vehicle after the vehicle is stopped by the deceleration and stop means, and a collision mitigation control means that, when a collision is detected by the collision detection means, rapidly decelerates and stops the vehicle by the deceleration and stop means, and after the vehicle stops, backs up and stops the vehicle by the backing up means.

Another aspect of the present invention provides a clutch device that is used as the clutch means of the collision mitigation mechanism, and includes an idle running mechanism that turns ON and OFF transmission of power of an input side to an output side, and an idle running control device that controls the turning ON/OFF, wherein the idle running mechanism includes an input-side rotor and an output-side rotor including pluralities of magnets aligned so as to have alternate polarities, and a sliding means that transmits rotation of the input-side rotor to the output-side rotor by a magnetic force generated between the magnets of the input-side rotor and the magnets of the output-side rotor when the idle running mechanism is ON, and slides at least one of the rotors so that no magnetic force is generated between the magnets of the input-side rotor and the magnets of the output-side rotor when the idle running mechanism is OFF, and the idle running control device includes a sensor means that detects a running state of the vehicle and road conditions, and an idle running control means that determines whether safe idle running is possible based on detection results by the sensor means, and outputs a corresponding idle running control signal to the sliding means. The aforementioned and other objects, features, and advantages of the present invention will become clear from the following detailed description and accompanying drawings.

Effect of Invention

According to the present invention, when a collision is detected, a rapid deceleration of a vehicle is performed, and after the vehicle stops, the vehicle is backed up and stopped, so that further expansion of the collision accident is reduced, and damage is mitigated. In addition, by the idle running mechanism, a state where safe idle running is possible is detected by the idle running control device and idle running is performed, so that while the configuration is simple, effective use of energy can be realized, and an improvement in fuel efficiency and reduction in environmental load can be realized.

DESCRIPTION OF EMBODIMENT

Hereinafter, an embodiment for carrying out the present invention will be described in detail based on examples.

Example 1

Figure 1A:
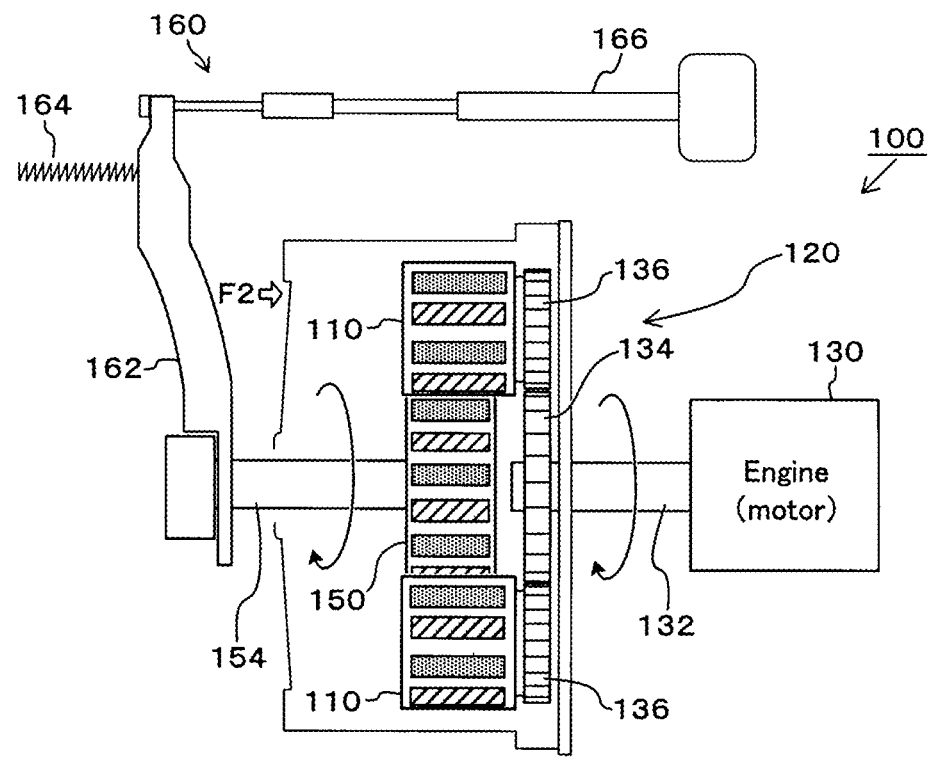
FIGS. 1(A) and 1(B) are diagrams illustrating a configuration of an idle running mechanism of Example 1 of the present invention.
Figure 1B:
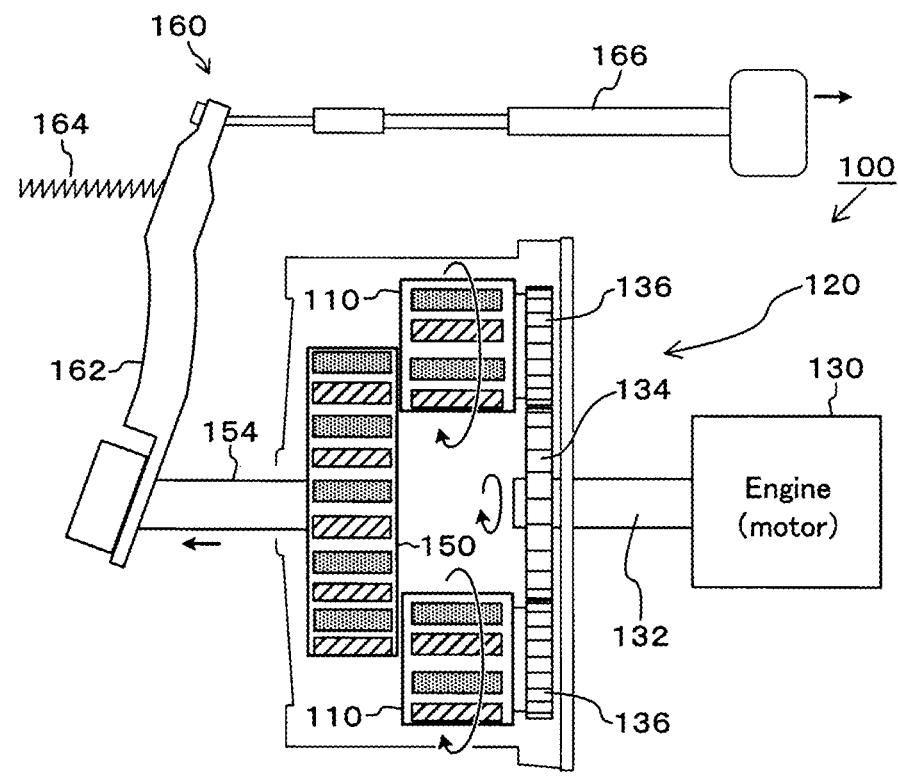
Figure 2A:
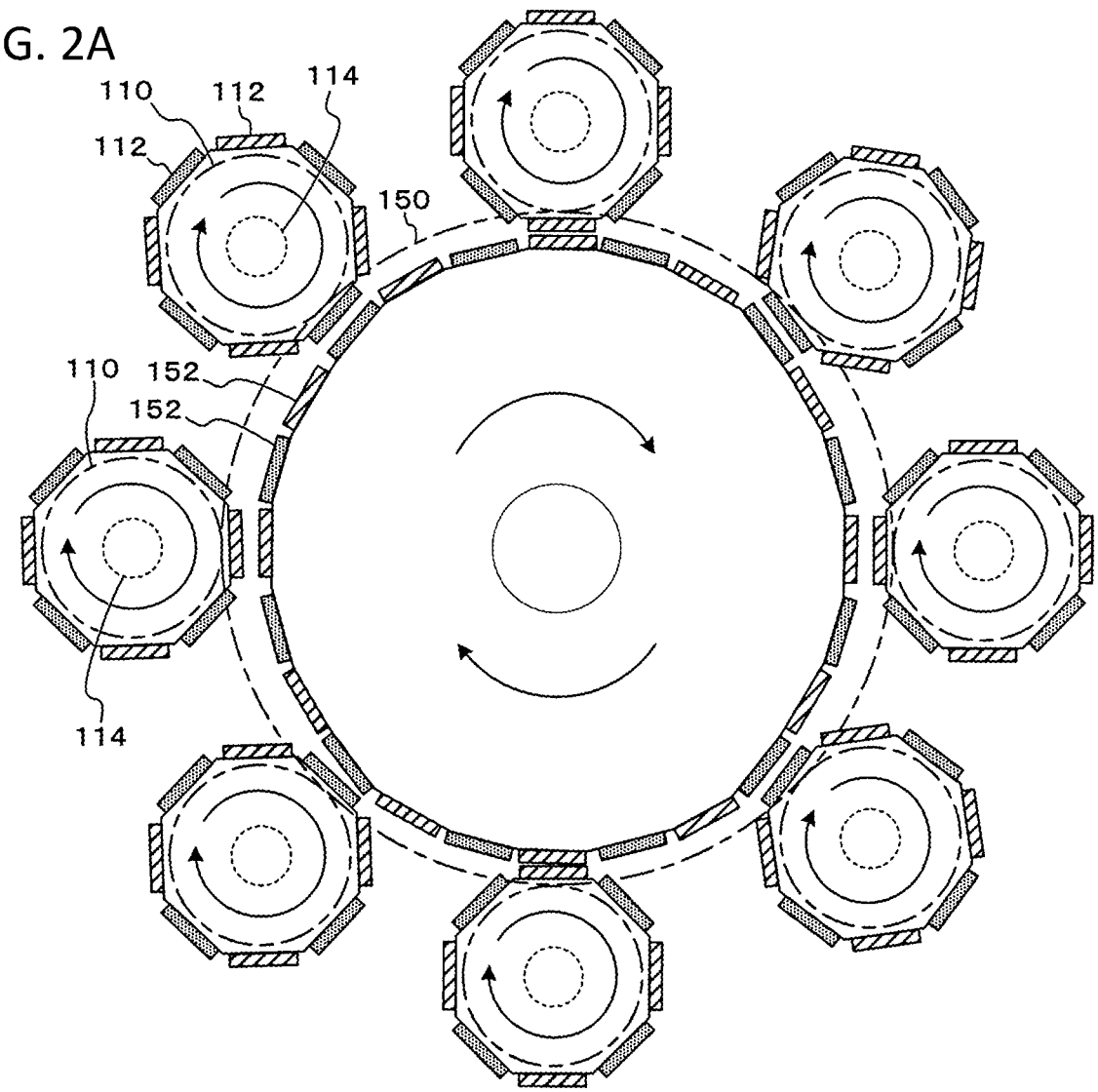
FIGS. 2(A) and 2(B) are views of the Example 1 from the arrow F2 direction.
Figure 2B:
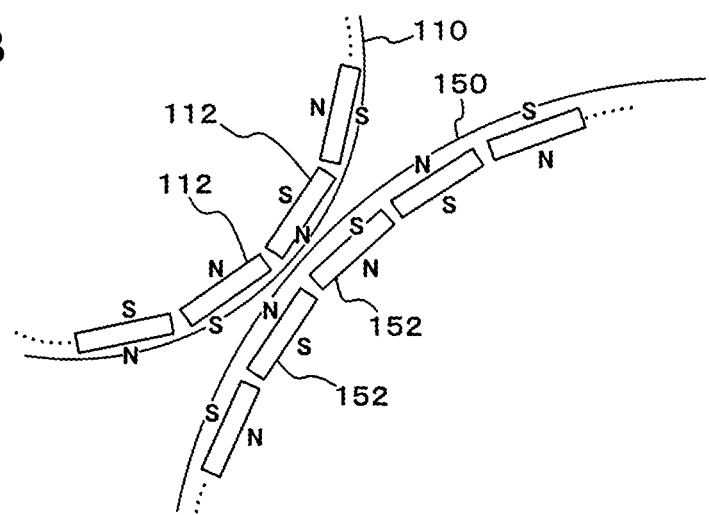

FIGS. 1(A) and 1(B) illustrate an idle running mechanism of a clutch device according to the present example, and FIG. 1(A) illustrates an "ON" state where a driving force is transmitted from an input shaft to an output shaft, and FIG. 1(B) illustrates an "OFF" state where a driving force is not transmitted from the input shaft to the output shaft. FIGS. 2(A) and 2(B) illustrates a state of a major portion viewed from an axial direction. In these drawings, the idle running mechanism 100 has a configuration in which a plurality of outer rotors 110 and an inner rotor 150 surrounded by the outer rotors are disposed. At an outer circumference of the outer rotor 110, a large number of magnets 112 are provided adjacent to each other, and at an outer circumference of the inner rotor 150, a large number of magnets 152 are provided adjacent to each other. Polarities of these magnets 112 and 152 have magnetization (magnetizing) directions set in thickness directions or radial directions, and are magnetized so that their N and S polarities become alternately opposite to each other.

The outer rotors 110 are rotatable around rotary shafts 114, and these rotary shafts 114 are driven to rotate by a gear mechanism 120. The gear mechanism 120 consists of a main gear 134 provided on a drive shaft 132 of an engine (or motor) 130, and a plurality of driven gears 136 that mesh with the main gear, and the plurality of driven gears 136 are provided on the rotary shafts 114 of the outer rotors 110. That is, when the drive shaft 132 is rotated by the engine 130, the main gear 134 rotates, and further, the driven gears 136 rotate and the rotary shafts 114 rotate, and accordingly, the outer rotors 110 rotate. On the other hand, the inner rotor 150 is supported rotatably by a driven shaft 154, and rotation of this driven shaft 154 is transmitted to an axle 204 (refer to FIGS. 3(A), 3(B) and 3(C)) of the automobile.

A small clearance is formed between the magnets 112 on the outer circumferential surfaces of the outer rotors 110 and the magnets 152 on the outer circumferential surface of the inner rotor 150 so as to avoid a contact between these magnets. The inner rotor 150 is configured to be slidable in the direction of the driven shaft 154 by a sliding mechanism 160. In the illustrated example, by biasing a lever 162 attached to the driven shaft 154 by a spring 164 at one side and biasing the lever by an idle running control actuator 166 at the other side toward an opposite direction, the outer rotors 110 are slid.

In the state illustrated in FIG. 1(A), the lever 162 is pulled by the spring 164, and magnetic forces of the magnets 112 of the outer rotors 110 and the magnets 152 of the inner rotor 150 influence each other. Therefore, when the outer rotors 110 rotate, due to action of the magnetic forces of the magnets 112 and 152, the inner rotor 150 rotates. That is, a driving force of the engine 130 is transmitted from the outer rotors 110 to the inner rotor 150 via the gear mechanism 120, and the driven shaft 154 rotates. This state is a state where idle running is ON.

On the other hand, in the state illustrated in FIG. 1(B), the lever 162 is pulled by the idle running control actuator 166 against the force of the spring 164, the inner rotor 150 moves to a position slid from the position of the outer rotors 110, and the magnetic forces of the magnets 112 and 152 do not influence each other. Therefore, even when the outer rotors 110 rotate, magnetic forces of the magnets 112 and 152 do not act, and the inner rotor 150 does not rotate. That is, the driving force of the engine 130 is not transmitted to the inner rotor 150 although it is transmitted to the outer rotors 110 via the gear mechanism 120, and the driven shaft 154 does not rotate. This state is a state where idle running is OFF.

Figures 3A, 3B, 3C:
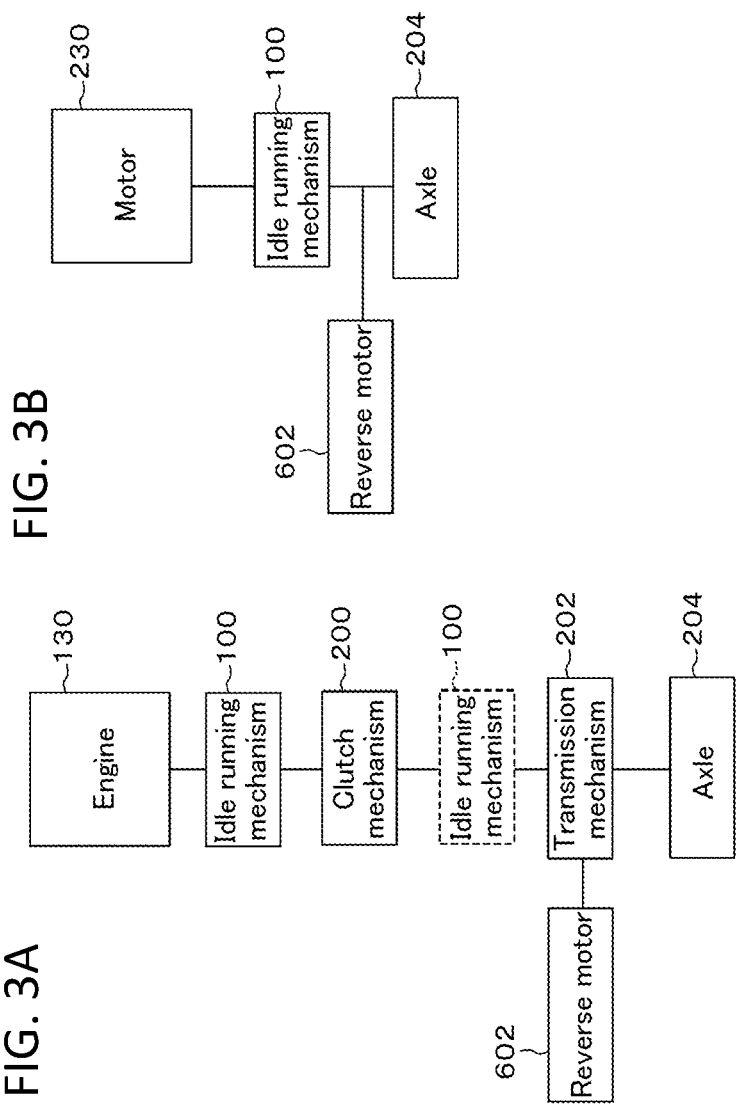
FIGS. 3(A), 3(B) and 3(C) are diagrams illustrating dispositions of the idle running mechanism of the Example 1 in automobiles.

FIGS. 3(A), 3(B) and 3(C) illustrate the entirety of a power transmission system including the above-described idle running mechanism 100. In the example of FIG. 3(A), the idle running mechanism 100 is provided between the engine 130 and a clutch mechanism 200, and a driving force of the clutch mechanism 200 is transmitted to the axle 204 via a transmission mechanism 202. The idle running mechanism 100 may be provided between the clutch mechanism 200 and the transmission mechanism 202. In the example of FIG. 3(B), a motor 230 is used instead of the engine 130, and a driving force of the motor is transmitted to the axle 204 via the idle running mechanism 100.

Figure 4:
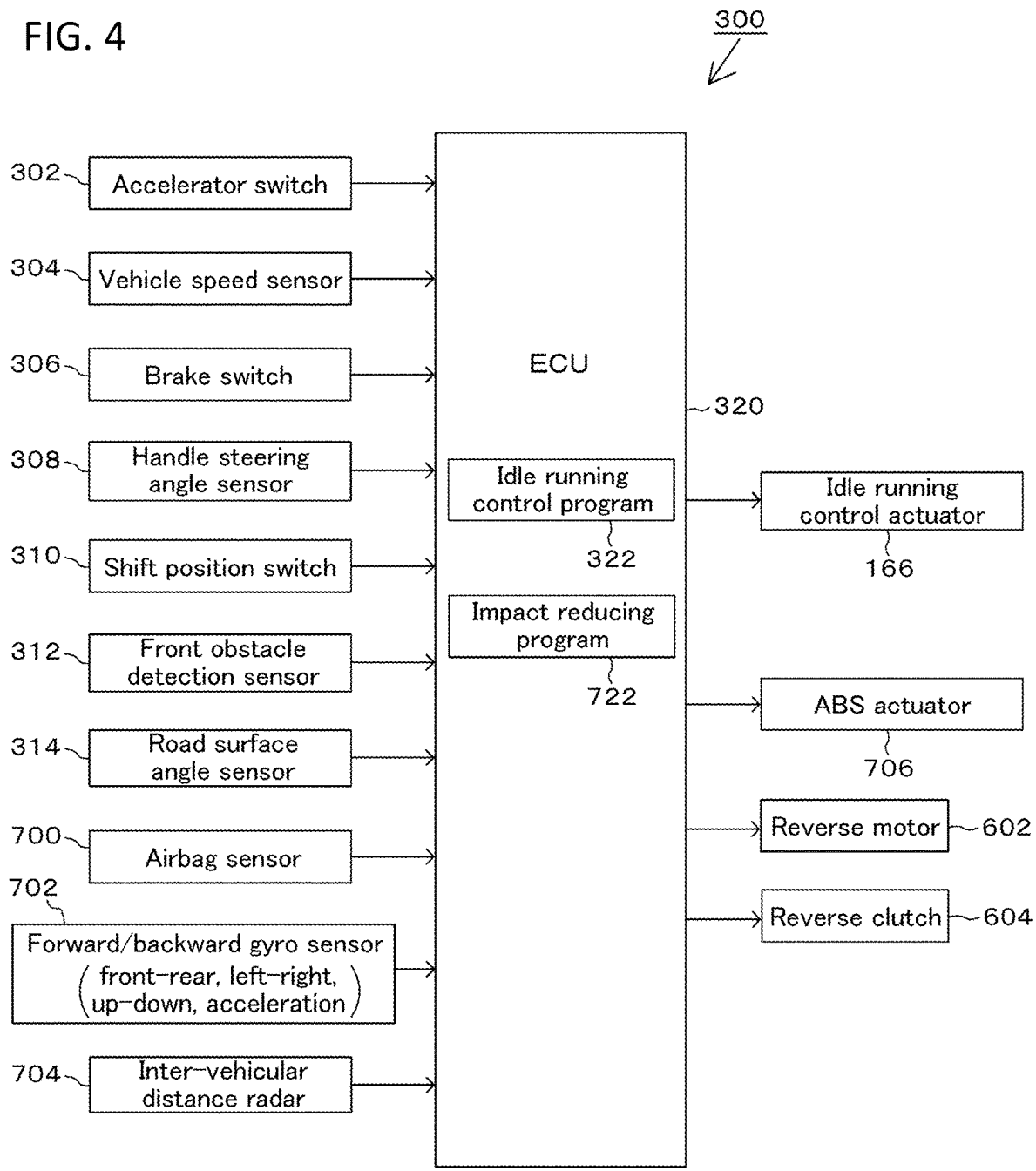
FIG. 4 is a diagram illustrating a control device of an example of the present invention.

Next, an idle running control device of the present example will be described with reference to FIGS. 4 and 5. FIG. 4 illustrates a configuration of an idle running control device 300 in which various switches or sensors 302 to 314 are connected to an ECU (engine control unit) 320. Among these, an accelerator switch 302 is a switch that detects whether an accelerator pedal has been stepped on, and for example, this switch is ON when the accelerator pedal is stepped on, and OFF when the accelerator pedal is not stepped on. The vehicle speed sensor 304 is a sensor that detects a running speed of the automobile. A brake switch 306 is a switch for detecting whether a brake pedal has been stepped on, and for example, it is ON when the brake pedal is stepped on, and is OFF when the brake pedal is not stepped on.

A handle steering angle sensor 308 is a sensor that detects whether a handle (steering wheel) has been turned as in the case of traveling on a curve, etc. A shift position switch 310 is a switch that detects a position of a shift lever, and is ON when the shift lever is at a top gear position, and is OFF when the shift lever is at other positions. A front obstacle detection sensor 312 is a sensor that detects whether an obstacle is present in front of the automobile. A road surface angle sensor 314 is a sensor that detects whether a road surface ahead on the road is a slope. Other sensors, etc., will be described later.

In the ECU 320, an idle running control program 322 is prepared, and by executing this, according to detection results by the above-described switches or sensors 302 to 314, an operation control signal is output to the idle running control actuator 166. FIG. 5 illustrates a flow of this operation. The ECU 320 has a function to control the entire operation of the automobile such as the engine or motor and air conditioning in addition to the above-described operations. An impact reducing program 722 will be described later.

Next, operation of the idle running control program 322 in the idle running control device 300 will be described as follows with reference to FIG. 5.

a. When the accelerator pedal is stepped on and the accelerator switch 302 is ON (Yes in Step S10), it is considered that acceleration or deceleration must be performed by an accelerator pedal operation, so that the driving force needs to be transmitted, and the idle running mechanism 100 is turned ON. That is, a control signal to turn ON the idle running mechanism 100 is output from the ECU 320 to the idle running control actuator 166, and the idle running mechanism 100 is turned ON (Step S24), and as illustrated in FIG. 1(A), the driving force is transmitted.

b. Even when the vehicle speed sensor 304 detects that the automobile is accelerating (Yes in Step S12), the driving force still needs to be transmitted, and the idle running mechanism 100 is turned ON.

c. When the brake pedal is stepped on and the brake switch is ON (Yes in Step S14), idle running is considered to be dangerous, so that the idle running mechanism 100 is turned ON.

d. When the handle steering angle sensor 308 detects that the handle has been turned to the left or the right (Yes in Step S16), the road is curved and idle running in the same manner is considered to be dangerous, so that the idle running mechanism 100 is turned ON.

e. When the shift position switch 310 detects that the shift lever is at a position other than the top gear position (No in Step S18), the automobile is considered to be accelerating or decelerating, so that the driving force needs to be transmitted, and the idle running mechanism 100 is turned ON.

f. When the front obstacle detection sensor 312 detects an obstacle ahead (Yes in Step S20), deceleration or handle turning is required, and idle running is considered to be dangerous, so that the idle running mechanism 100 is turned ON.

g. When the road surface angle sensor 314 detects that a road surface ahead is upslope or downslope (Yes in Step S22), acceleration or engine braking is required, and idle running is considered to be dangerous, so that the idle running mechanism 100 is turned ON.

On the other hand, when the above-described conditions are not satisfied, it is determined that idle running poses no danger, and a control signal to turn OFF the idle running mechanism 100 is output from the ECU 320 to the idle running control actuator 166, and the idle running mechanism 100 is turned OFF as illustrated in FIG. 1(B) (Step S26). Accordingly, power from the engine 130 is not transmitted, and becomes an idle running state.

Figure 6A:
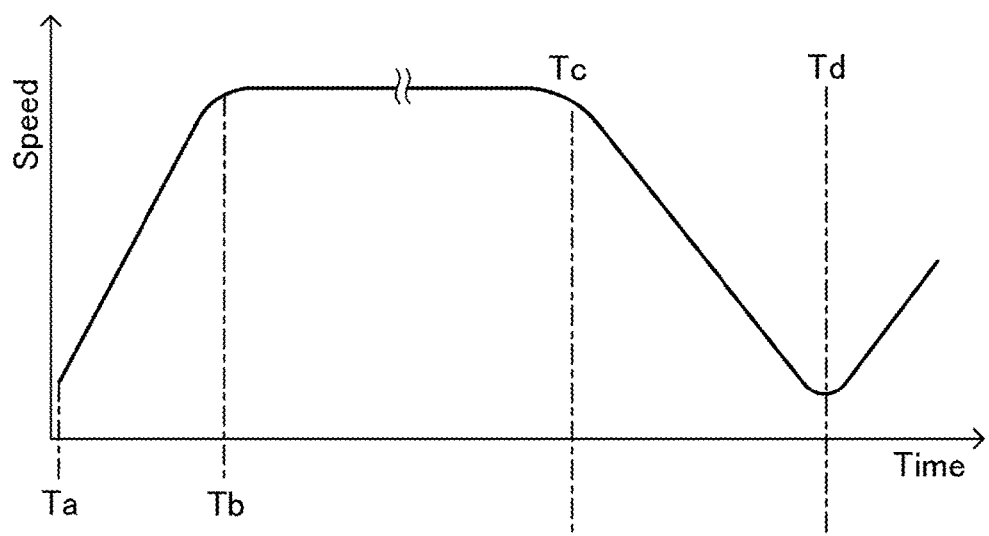
FIGS. 6(A) and 6(B) are diagrams illustrating a running example of an automobile and an example of operation of the idle running mechanism.
Figure 6B:
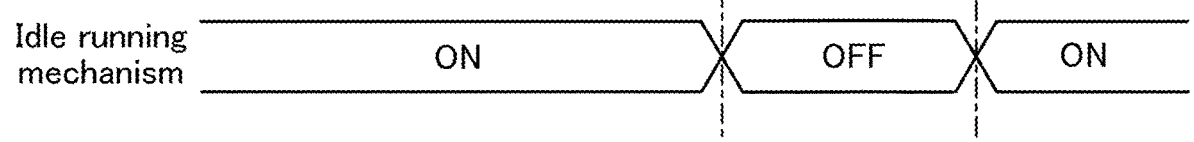

Next, the entire operation of the present example will be described with reference to FIGS. 6(A) and 6(B) as well. FIG. 6(A) is a graph illustrating an example of acceleration/deceleration of an automobile, and illustrates speed changes when the automobile accelerates from a time Ta to a time Tb, and is then driven at a constant speed, decelerates from a time Tc to a time Td, and then accelerates again. FIG. 6(B) illustrates ON/OFF states of the idle running mechanism 100.

First, during the acceleration period from the time Ta to the time Tb, the accelerator pedal is stepped on, so that the accelerator switch 302 is turned ON (Yes in Step S10). Therefore, in the ECU 320, a control signal to turn ON the idle running mechanism 100 is output by the idle running control program 322 to the idle running control actuator 166 (refer to FIG. 4). Accordingly, the idle running control actuator 166 goes into the ON state illustrated in FIG. 1(A) (Step S24), and a driving force of the engine 130 is transmitted from the outer rotors 110 to the inner rotor 150 via the gear mechanism 120, the driven shaft 154 rotates, and further, via the clutch mechanism 200 and the transmission mechanism 202, the axle 204 is rotated, and the automobile accelerates. When the automobile is accelerating on a slope, etc., the accelerator pedal may not be stepped on and the accelerator switch 302 may be OFF (No in Step S10), however, the vehicle speed sensor 304 detects that the automobile is accelerating (Yes in Step S12), so that the idle running mechanism 100 is turned ON as illustrated in FIG. 6(B) (Step S24), and power is transmitted.

Next, during a constant-speed period from the time Tb to the time Tc, the accelerator switch 302 is still ON (No in Step S10), so that the idle running mechanism 100 is also kept ON, and power is transmitted.

Next, during the deceleration period from the time Tc to the time Td, the accelerator pedal is released and the accelerator switch 302 is turned OFF (No in Step S10), and the automobile decelerates (No in Step S12), so that when the brake pedal is not stepped on (No in Step S14), when the handle is not turned (No in Step S16), when the shift lever is at the top gear position (Yes in Step S18) and no obstacle is present ahead (No in Step S20), or when the road surface ahead is not a slope (No in Step S22), in the ECU 320, a control signal to turn OFF the idle running mechanism 100 is output by the idle running control program 322 to the idle running control actuator 166. Accordingly, the idle running control actuator 166 goes into the OFF state illustrated in FIG. 1(B) (Step S26), and the driving force of the engine 130 is not transmitted to the axle 204 (refer to FIG. 6(B)). That is, the automobile goes into an idle running state where it runs inertially, and the engine 130 becomes unloaded and idles. Therefore, fuel consumption and an exhaust gas discharge amount of the engine 130 are reduced, and an improvement in fuel efficiency and reduction in environmental load can be realized. In addition, as illustrated in FIG. 3(B), when the motor 230 is used as a drive source, the motor 230 can be completely stopped, and wasteful energy consumption can be suppressed.

Next, after the time Td, the automobile is accelerated again, so that the state becomes the same as during the period from the time Ta to the time Tb described above, and the driving force of the engine 130 is transmitted to the axle 204 and the automobile is accelerated.

As described above, according to the present example, the outer rotors 110 and the inner rotor 150 of the idle running mechanism 100 are configured by using permanent magnets, and at the time of deceleration while traveling straight on a flat road, the idle running mechanism 100 is turned OFF and idle running is performed, so that while the configuration is simple, effective use of energy can be realized, and an improvement in fuel efficiency and reduction in environmental load can be realized.

Example 2

Figure 7A:
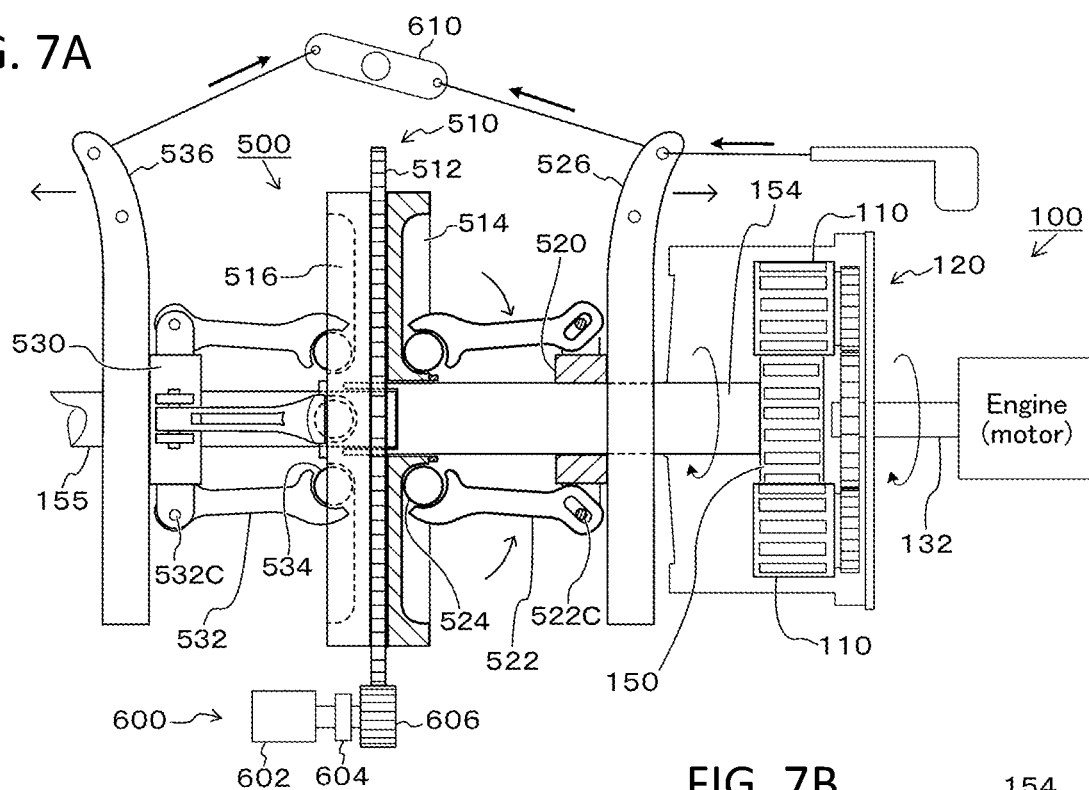
FIGS. 7(A), 7(B) and 7(C) are views illustrating configurations of an idle running mechanism and an impact reducing mechanism of Example 2 of the present invention.
Figure 7B:
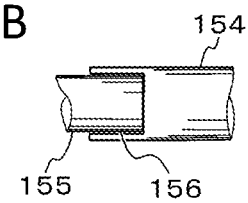
Figure 7C:
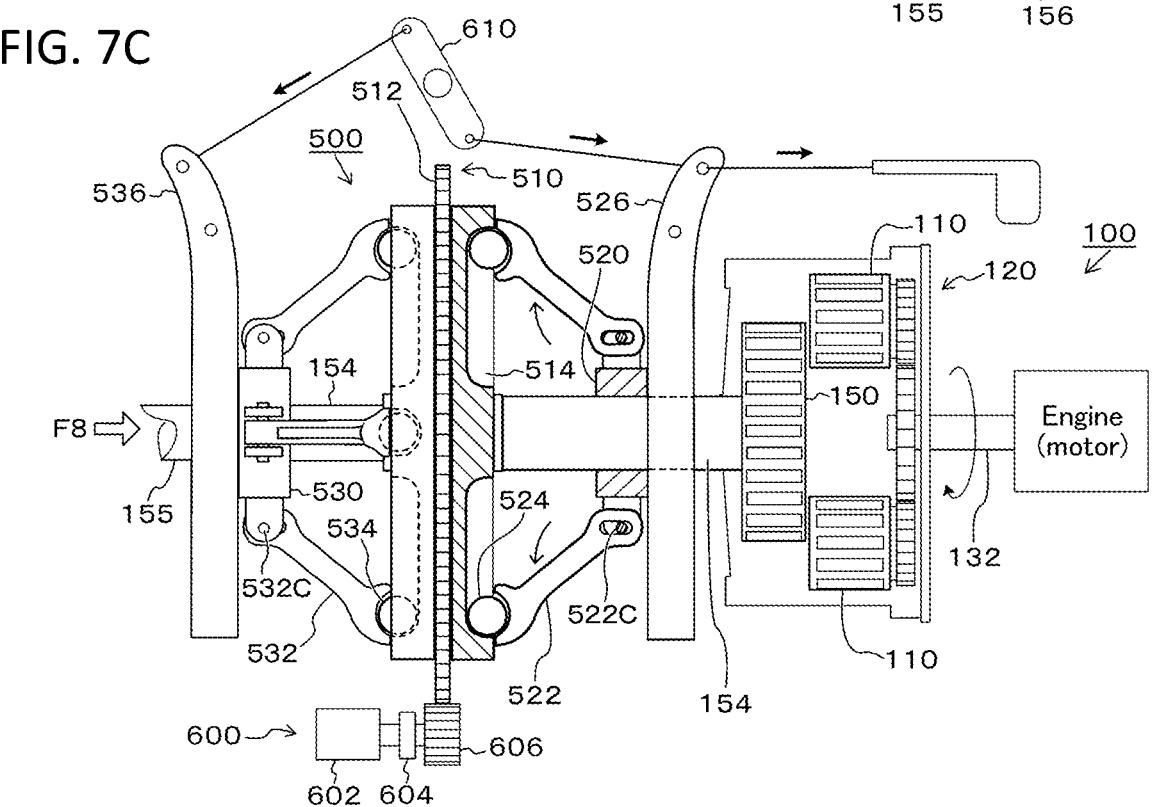
Figure 8:
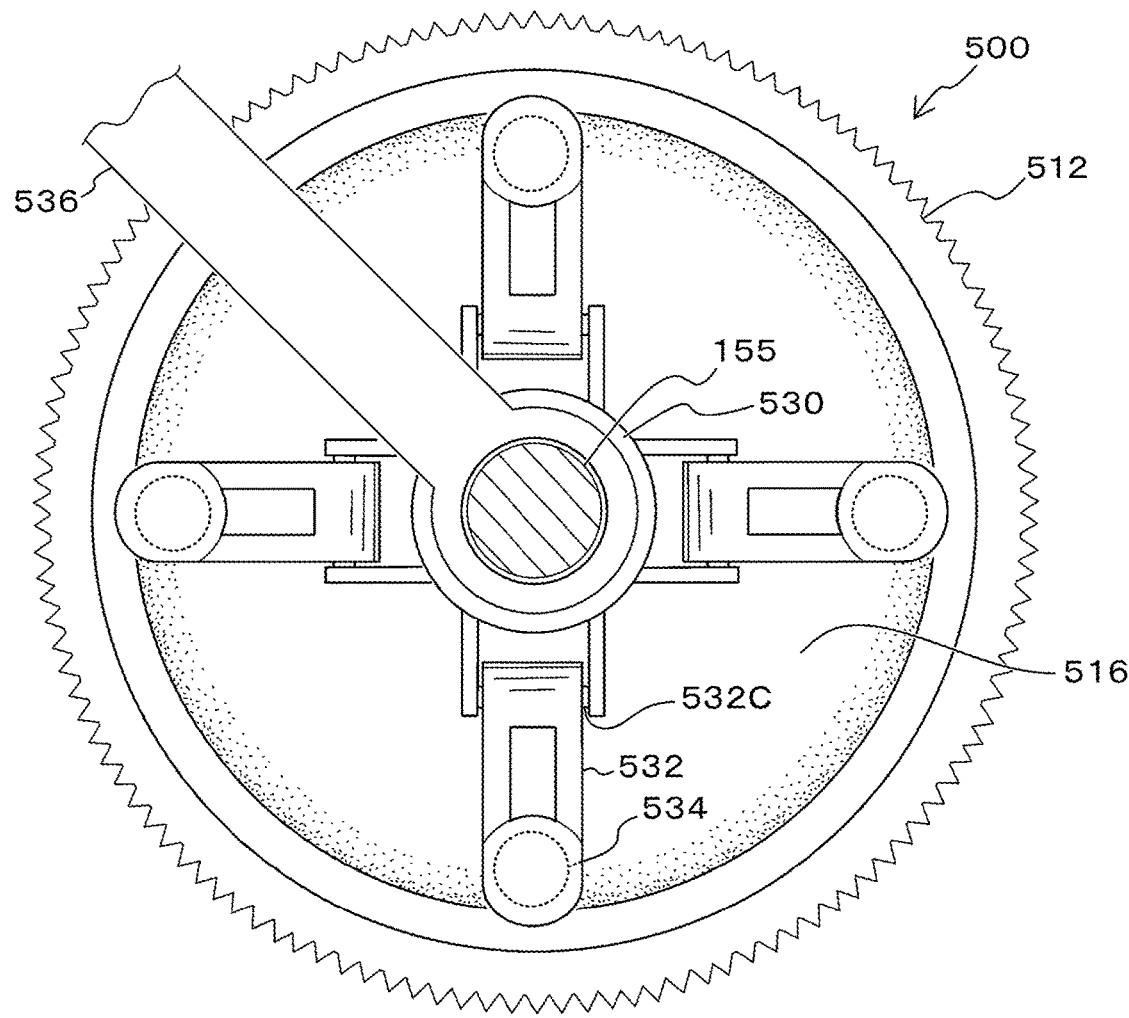
FIG. 8 is a view of the impact reducing mechanism of the Example 2 as viewed from the arrow F8 direction.

Next, Example 2 of the clutch device of the present invention will be described with reference to FIGS. 7(A), 7(B) and 7(C) to 9 as well. FIGS. 7(A), 7(B) and 7(C) illustrate mechanical configurations of the present example, and FIG. 7(A) illustrates an "ON" state where the driving force is transmitted from the input shaft to the output shaft, and FIG. 7(C) illustrates an "OFF" state where the driving force is not transmitted from the input shaft to the output shaft. FIG. 8 is a view from the arrow F8 direction in FIG. 7(C). As illustrated in these drawings, the present Example 2 is an example in which an impact reducing mechanism 500 is provided on an output side of the idle running mechanism 100 described above. The impact reducing mechanism 500 is configured around a rotary disk 510 attached to the driven shaft 154, and before and after the rotary disk 510, sliding bodies 520 and 530 that slide along the driven shaft 154 and the output shaft 155 in an axial direction are respectively provided. As illustrated in FIG. 7(B), the driven shaft 154 and the output shaft 155 are engaged with each other via a frictional material 156, and both of these shafts slide when a certain or more force acts. Accordingly, the operation described later is smoothly performed.

The rotary disk 510 is provided with a rotation control gear 512 using the driven shaft 154 as a rotary shaft, and to the rotary disk, a control driving force of a reverse driving unit 600 is transmitted. That is, a driving force of a rotary shaft of a reverse motor 602 of the reverse driving unit 600 is transmitted to the rotation control gear 512 via a reverse clutch 604 and a control drive gear 606.

The above-described sliding body 520 is provided with a plurality of arms 522 in a swingable manner, and on tip ends of these arms 522, rollers 524 are provided. The other sliding body 530 is provided with a plurality of arms 532 in a swingable manner, and on tip ends of these arms 532, rollers 534 are provided. On the other hand, on the front and rear surfaces of the rotary disk 510, recessed portions 514 and 516 are respectively provided so that the rollers 524 and 534 described above slide in radial directions.

In the recessed portion 514 on the input side of the rotary disk 510, according to sliding of the sliding body 520 along the driven shaft 154, the arms 522 open and close in radial directions around pivots 522C. The arms 522 are closed in the "ON" state illustrated in FIG. 7(A), and are open in the "OFF" state illustrated in FIG. 7(B). On the other hand, in the recessed portion 516 on the output side of the rotary disk 510, according to sliding of the sliding body 530 along the driven shaft 154, the arms 532 open and close in radial directions around pivots 532C. The arms 532 are closed in the "ON" state illustrated in FIG. 7(A), and are open in the "OFF" state illustrated in FIG. 7(C).

The sliding bodies 520 and 530 are slid along splines in the direction of the driven shaft 154 by the levers 526 and 536, and the levers 526 and 536 are connected by wires, etc., to the accelerator lever 610 interlocking with movement of the accelerator pedal. As illustrated in FIG. 7(A), in the ON state where the accelerator pedal is stepped on, both of the arms 522 and 532 are closed as illustrated in FIG. 7(A), and in the OFF state where the accelerator pedal is not stepped on, both of the arms 522 and 532 open as illustrated in FIG. 7(C).

Next, in the present example, as illustrated in FIG. 4, in addition to the reverse motor 602 and the reverse clutch 604 of the reverse driving unit 600 described above, an airbag sensor 700, etc., are connected to the ECU 320. The airbag sensor 700 is a sensor that detects whether an airbag has operated. A gyro sensor 702 is a sensor that detects rotation or orientation with respect to each of the front-rear, left-right, and up-down directions, and detects an acceleration. An inter-vehicular distance radar 704 is a sensor that detects a distance to a vehicle running ahead. An ABS (Antilock Brake System) actuator 706 is for actuating the ABS.

FIG. 3(C) illustrates the entirety of a power transmission system including the above-described impact reducing mechanism 500, configured so that the idle running mechanism 100 and the impact reducing mechanism 500 are provided between the engine 130 and the transmission mechanism 202, and the reverse driving unit 600 is provided in the impact reducing mechanism 500.

Figure 9:
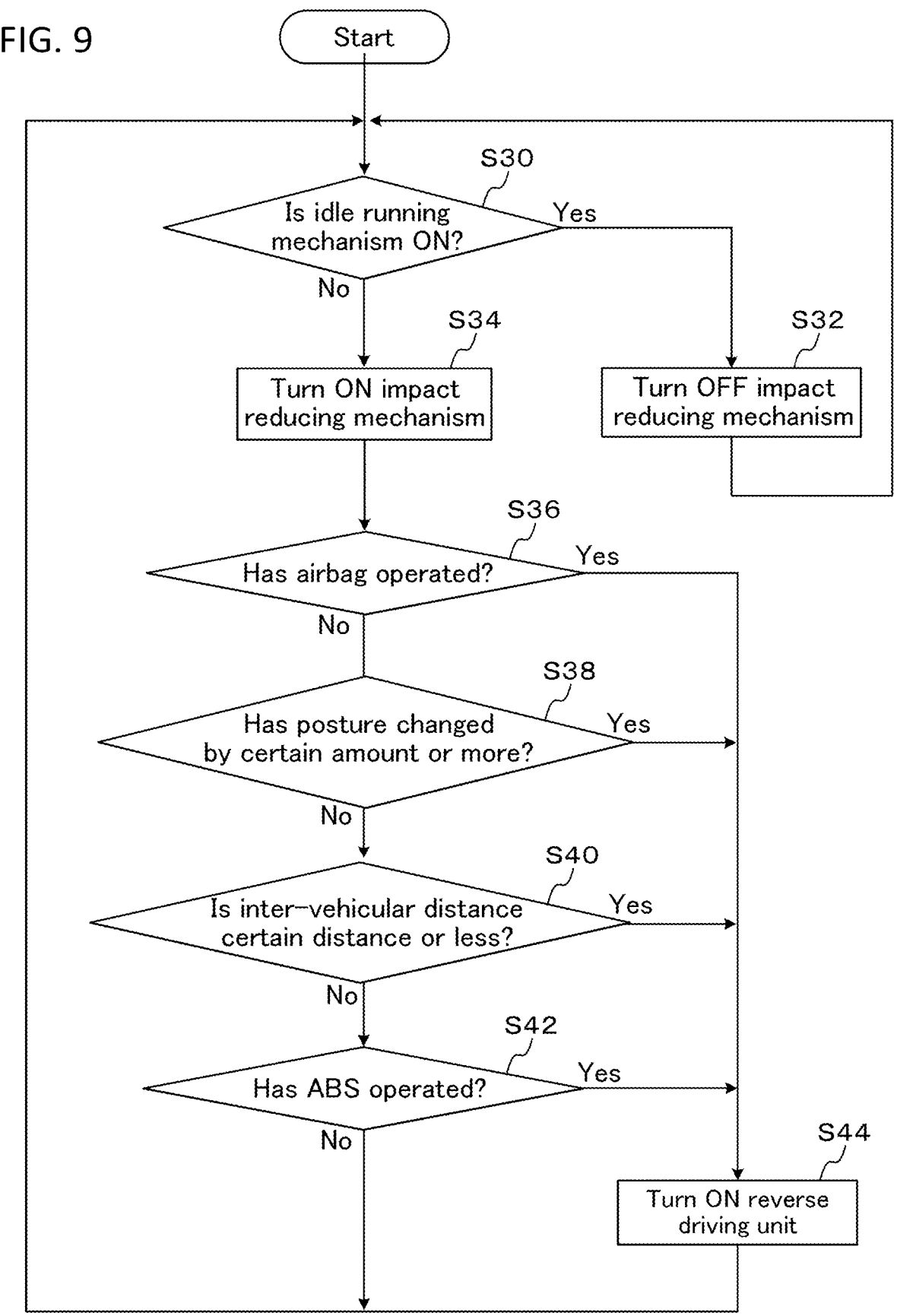
FIG. 9 is a flowchart illustrating an operation of the impact reducing program of the Example 2.

Next, operation of the present example will be described with reference to the flowchart of FIG. 9 as well. First, at the time of acceleration and running (Ta to Tc) illustrated in FIGS. 6(A) and 6(B), as illustrated in FIG. 7(A), the idle running mechanism 100 goes into an ON state (Yes in Step S30), and the sliding bodies 520 and 530 are separated from the rotary disk 510. Accordingly, both of the arms 522 and 532 are closed. Therefore, the impact reducing mechanism 500 goes into an OFF state where it does not operate (Step S32).

On the other hand, at the time of deceleration (Tc to Td) illustrated in FIGS. 6(A) and 6(B), as illustrated in FIG. 7(C), the idle running mechanism 100 goes into an OFF state (No in Step S30), the accelerator pedal is released, and the accelerator lever 610 turns. Therefore, the sliding bodies 520 and 530 gradually approach the rotary disk 510, and both of the arms 522 and 532 gradually open. Then, at the outer side of the rotary disk 510, the arms 522 and 532 are pulled, and as compared with the case in FIG. 7(A), the torque increases and acts in a direction in which the rotation speed decreases, and becomes an ON state (Step S34). Therefore, an impact when the idle running mechanism 100 is turned OFF is reduced, and smooth shifting to an idle running state is enabled.

In other words, it can be considered that a diameter of a gear that drives the rotary disk 510 differs between in FIG. 7(A) and in FIG. 7(C). In the case of FIG. 7(A), the gear has a small diameter, and in the case of FIG. 7(C), the gear has a large diameter. As the gear increases in diameter, the rotation speed of the rotary disk 510 decreases.

At the time of the operation described above, when the airbag sensor 700 detects an airbag operation (Yes in Step S36), when the gyro sensor 702 detects a certain amount or more of change in posture or acceleration (Yes in Step S38), when the inter-vehicular distance radar 704 detects that the distance to a vehicle ahead has become a certain distance or less (Yes in Step S40), and when the ABS actuator 706 detects an ABS operation (Yes in Step S42), the reverse driving unit 600 is turned ON by the impact reducing program 722 (refer to FIG. 4) (Step S44). That is, the reverse clutch 604 is turned ON, and the reverse motor 602 is driven. Therefore, the rotary disk 510 is forcibly stopped, and the driven shaft 154 also stops rotating, and the automobile stops.

In this way, according to the present example, the impact reducing mechanism 500 is added to the idle running mechanism 100, so that the following effects are obtained:

a. The impact reducing mechanism reduces an impact at the time of ON/OFF switching of the idle running mechanism 100.
b. In an emergency, the impact reducing mechanism can stop the automobile and functions as an automatic brake.

Example 3

Figure 10:
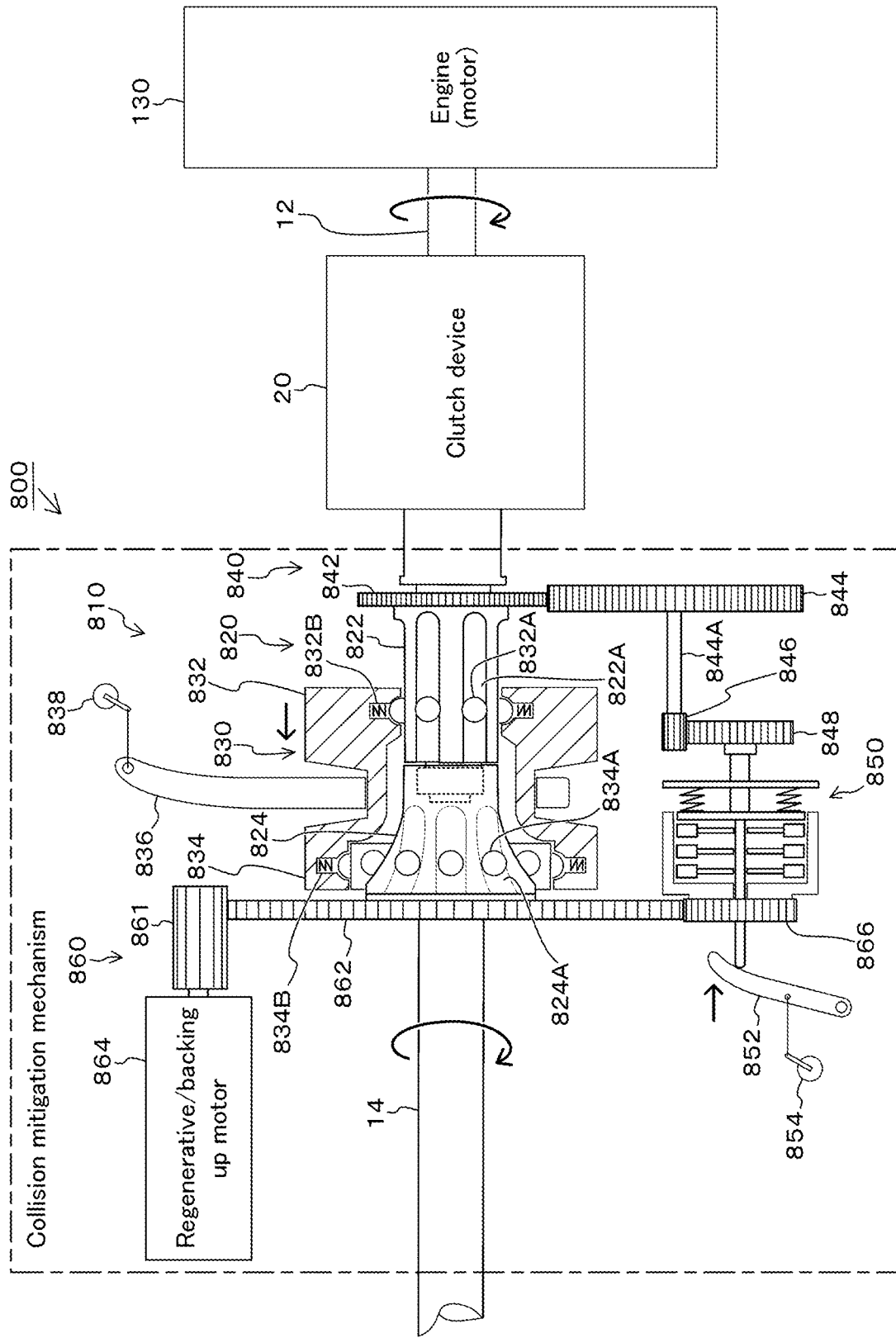
FIG. 10 is a diagram illustrating a collision mitigation mechanism of Example 3 of the present invention.

Next, with reference to FIGS. 10 to 14, an example of the collision mitigation mechanism of the present invention will be described. The present example has the purpose of mitigating an impact at the time of a collision of an automobile. In FIG. 10, the drive shaft 12 of the engine (or motor) 130 as a drive source is connected to the collision mitigation mechanism 800 of the present example via an appropriate clutch device 20. The collision mitigation mechanism 800 includes a high-load ball clutch 810 and a reversing high-load multiple disk clutch 850.

Among these members, as the clutch device 20, various publicly known clutch devices may be applied, or the idle running mechanism 100 of Example 1 described above may be used. The high-load ball clutch 810 consists of a driving force transmission ring 820 and a sliding body 830. The driving force transmission ring 820 is joined to the drive shaft 12, and consists of an input-side transmission ring 822 and an output-side transmission ring 824. The input-side transmission ring 822 of these transmission rings rotates together with the drive shaft 12. On the other hand, the output-side transmission ring 824 is freely rotatable forward and reversely, and rotates forward and reversely according to a position of the sliding body 830. The input-side transmission ring 822 is provided with a plurality of ball rails 822A along a rotary shaft direction. The output-side transmission ring 824 is provided with a plurality of ball rails 824A that gradually open in a direction orthogonal to the rotary shaft. Both of the ball rails 822A and 824A are provided at even intervals in a circumferential direction of the rotary shaft.

On the other hand, the sliding body 830 includes an input-side (engine-side) annular ball holding portion 832 and an output-side annular ball holding portion 834. Inside the input-side annular ball holding portion 832, a plurality of balls 832A are provided corresponding to the ball rails 822A, and are biased to the rail sides by springs 832B. On the other hand, inside the opposite output-side annular ball holding portion 834, a plurality of balls 834A are provided corresponding to the ball rails 824A, and are biased to the rail sides by springs 834B. Between these annular ball holding portions 832 and 834, a collision mitigation lever 836 is provided, and is driven by a ball clutch actuator 838.

The balls 832A of the input-side annular ball holding portion 832 of the sliding body 830 are in contact with the ball rails 822A. The balls 834A of the output-side annular ball holding portion 834 come into contact with the ball rails 824A according to a position of the sliding body 830. When the sliding body is at the position illustrated in FIG. 10, the balls 834A are in contact with the ball rails 824A, however, the balls are not in contact in FIGS. 12 and 13 described later.

Next, the input-side transmission ring 822 of the driving force transmission ring 820 described above is provided with an inertia absorbing gear mechanism 840. The inertia absorbing gear mechanism 840 consists of a gear 842 provided on an outer circumference of the input-side transmission ring 822 of the driving force transmission ring 820, a gear 844 that meshes with the gear 842, a gear 846 provided on a rotary shaft 844A of the gear 844, and a gear 848 that meshes with the gear 846, and is connected to the reversing high-load multiple disk clutch 850. The inertia absorbing gear mechanism 840 operates when the drive shaft 12 rotates, and a driving force is transmitted to the gear 842→the gear 844→the gear 846→the gear 848→the reversing high-load multiple disk clutch 850 in order.

Gear ratios of the respective gears are set so that, when a collision is detected and the reversing high-load multiple disk clutch 850 is turned ON as described later although the reversing high-load multiple disk clutch 850 is normally OFF, a regenerative/backing up motor 864 rotates at a high rotation speed via the reversing high-load multiple disk clutch 850, in other words, a greater regenerative load is applied and inertia is absorbed.

The reversing high-load multiple disk clutch 850 is a multiple disk type so as to withstand a high load, and is switched between ON/OFF (turned ON/OFF) by a reverse lever 852. The reverse lever 852 is driven by a multiple disk clutch actuator 854. FIG. 10 illustrates a state where the reversing high-load multiple disk clutch 850 is OFF.

On the other hand, the output-side transmission ring 824 of the driving force transmission ring 820 is provided with a driving force output shaft 14. This output shaft 14 is connected to a tire side of the automobile so as to transmit the driving force. The output-side transmission ring 824 is freely rotatable forward and reversely as described above, and therefore, the output shaft 14 also rotates forward and reversely. The output shaft 14 is provided with a reversing mechanism 860. The reversing mechanism 860 consists of a gear 862 provided on the output shaft 14, a regenerative/backing up motor 864 and a gear 861 that drive the gear in a reverse direction, and a gear 866 that transmits an output of the reversing high-load multiple disk clutch 850. Reverse rotation of the regenerative/backing up motor 864 is transmitted to the output shaft 14 so as to become a large torque by the gears 861 and 862 although its rotation speed is low.

Figure 12:
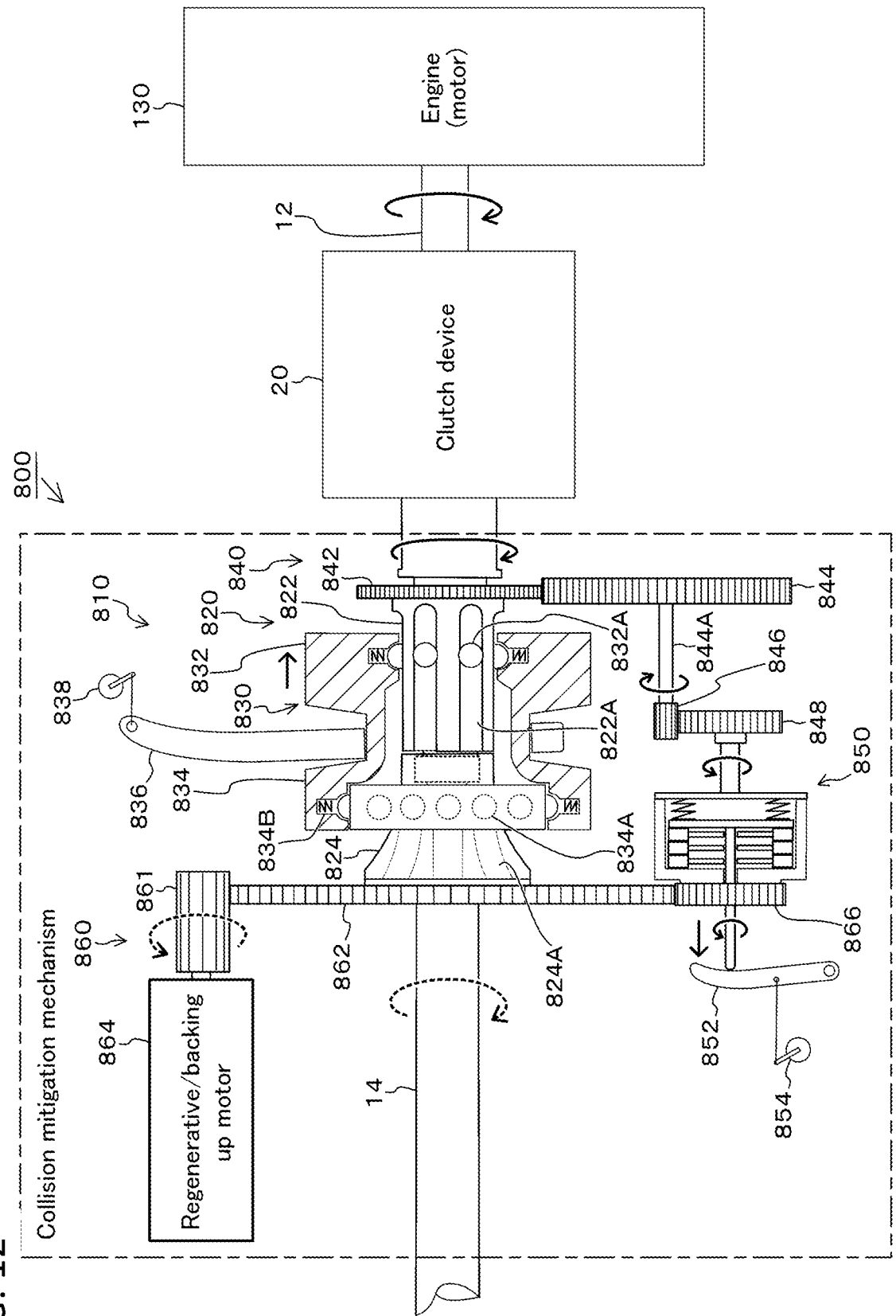
FIG. 12 is a view illustrating a state at the time of deceleration/regeneration in the Example 3.
Figure 13:
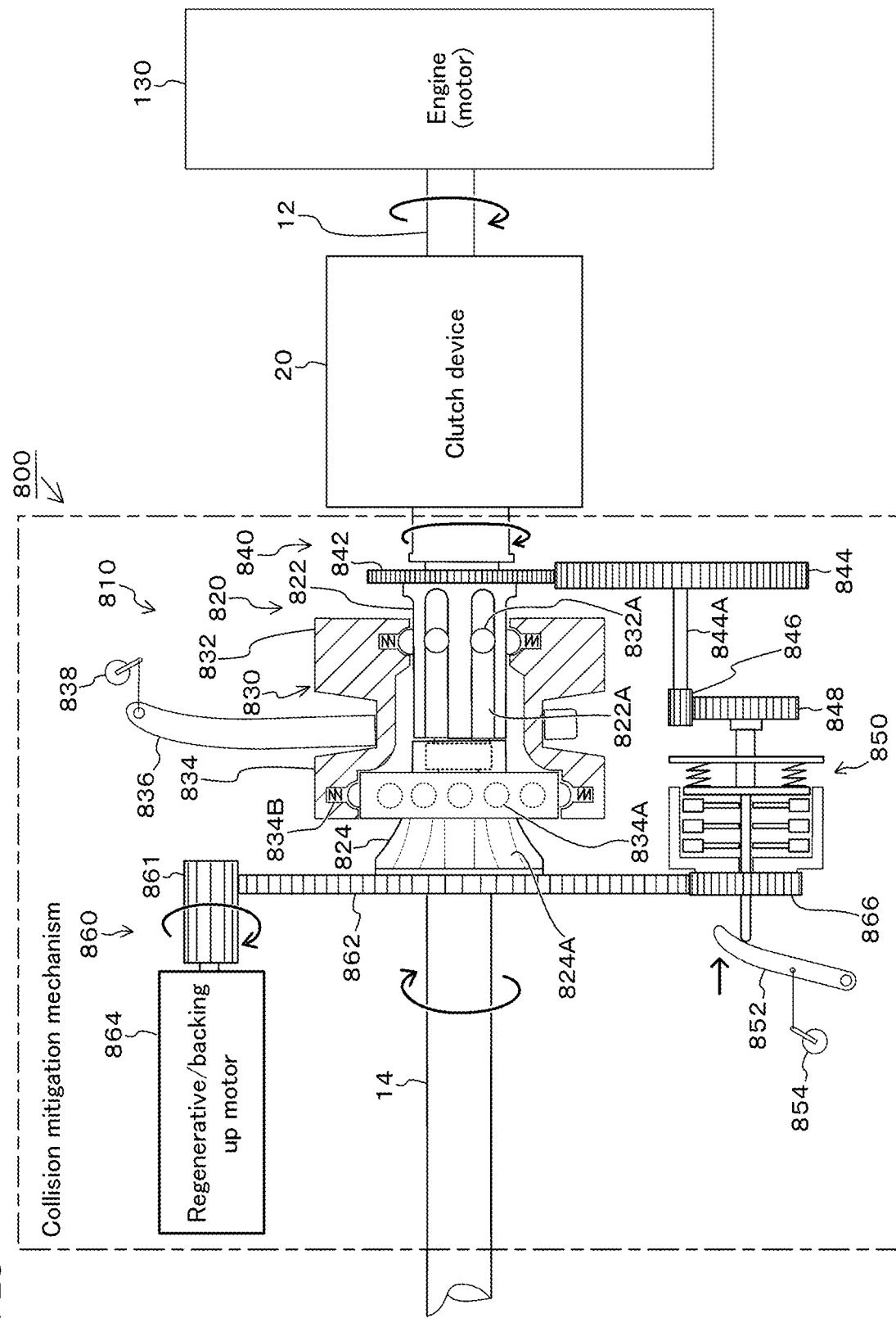
FIG. 13 is a view illustrating a state at the time of backing up in the Example 3.

Here, operation of the high-load ball clutch 810 configured as described above will be described. The sliding body 830 is normally at the position illustrated in FIG. 10. That is, a driving force of the drive shaft 12 is transmitted to the input-side transmission ring 822→the ball rails 822A→the balls 832A of the driving force transmission ring 820→the input-side annular ball holding portion 832→the output-side annular ball holding portion 834→the balls 834A→the ball rails 824A→the output-side transmission ring 824 of the sliding body 830→the output shaft 14 in order. That is, the high-load ball clutch 810 is in an ON state. On the other hand, when the ball clutch actuator 838 is driven, by the collision mitigation lever 836, the sliding body 830 is slid as illustrated in FIG. 12 or 13. Then, the balls 834A of the output-side annular ball holding portion 834 separate from the ball rails 824A of the output-side transmission ring 824. Therefore, the high-load ball clutch 810 goes into an OFF state.

Figure 11A:
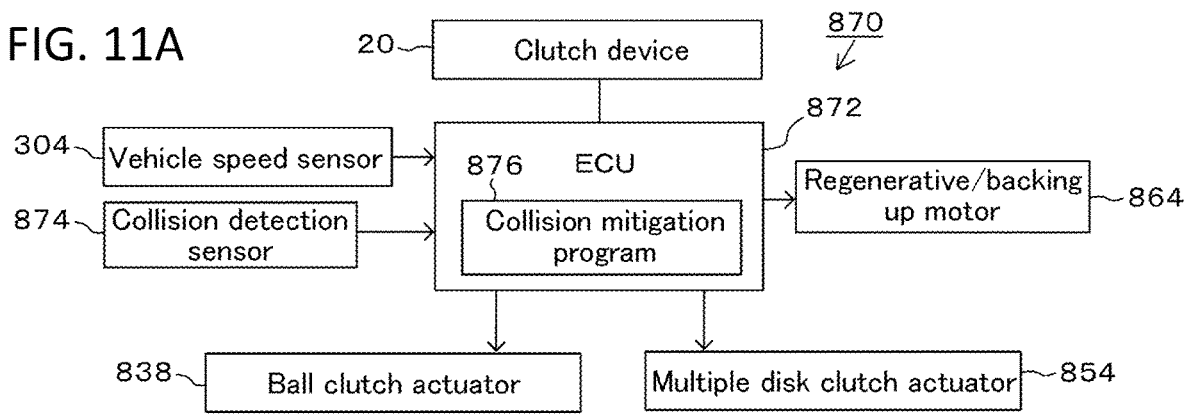
FIG. 11(A) is a diagram illustrating a control device of the Example 3.
Figure 11B:
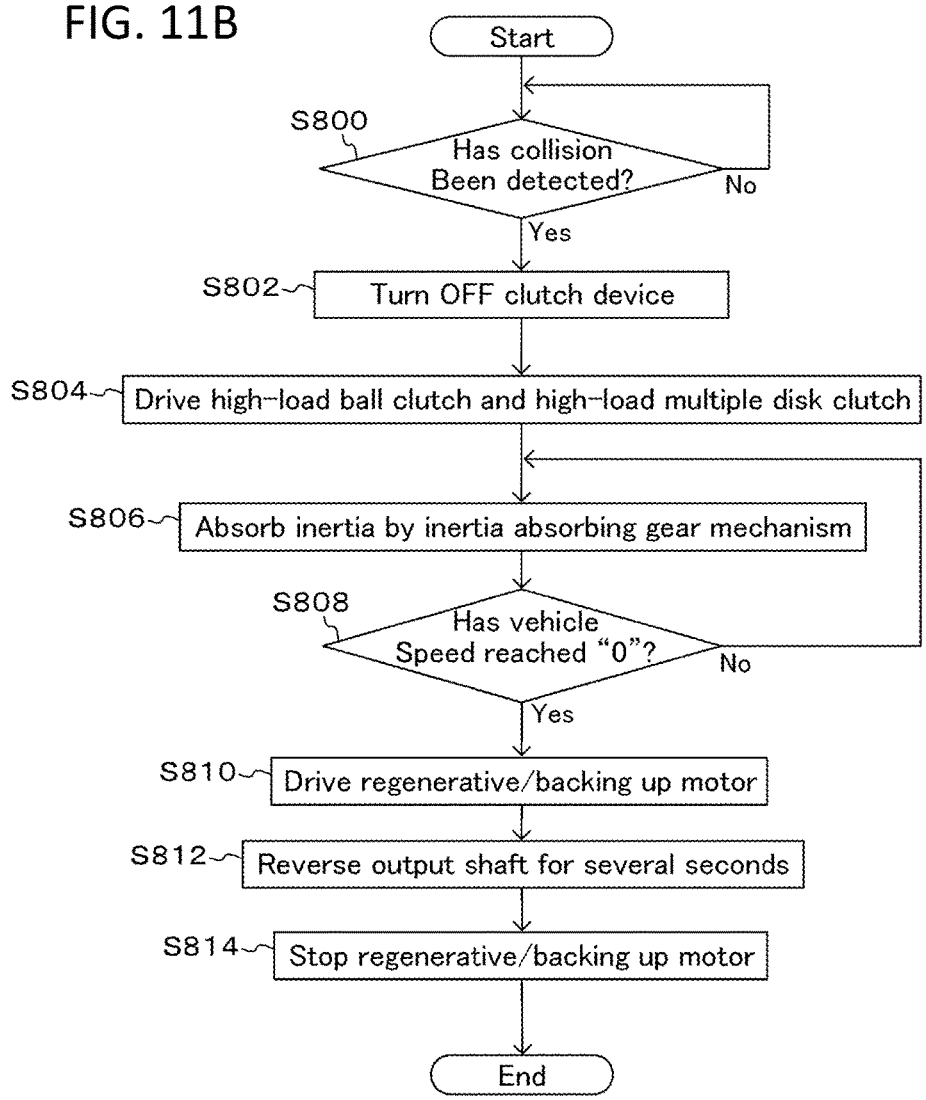
FIG. 11(B) is a flowchart illustrating operation of the control device.

FIG. 11 illustrates a collision mitigation control device 870 of the present example, and to an ECU 872, a collision detection sensor 874 is connected in addition to the above-described clutch device 20, vehicle speed sensor 304, ball clutch actuator 838, multiple disk clutch actuator 854, and regenerative/backing up motor 864. In the ECU 872, a collision mitigation program 876 is prepared. When this program is executed in the ECU 872, the operation illustrated in FIG. 11(B) is performed.

Next, operation of the present example will be described with reference to FIGS. 12 and 13 as well. In normal running, as illustrated in FIG. 10, the clutch device 20 is ON, the high-load ball clutch 810 is ON, and the reversing high-load multiple disk clutch 859 is OFF. Therefore, the driving force of the engine 130 is transmitted to the drive shaft 12→the clutch device 20→the high-load ball clutch 810→the output shaft 14 in order. In this running state, when a collision accident occurs and is detected by the collision detection sensor 874 (Yes in Step S800 in FIG. 11(B)), the ECU 872 executing the collision mitigation program 876 turns the clutch device 20 OFF (Step S802) and drives the high-load ball clutch actuator 838 and the high-load multiple disk clutch actuator 854 (Step S804). Accordingly, even when a driver continuously steps on the accelerator pedal, the clutch device 20 is turned OFF, so that the driving force of the engine 130 is not transmitted. In addition, as illustrated in FIG. 12, the high-load ball clutch 810 switches from ON to OFF, and the reversing high-load multiple disk clutch 850 switches from OFF to ON.

Then, as illustrated in FIG. 12, the driving force of the drive shaft 12 is transmitted to the reversing high-load multiple disk clutch 850 via the inertia absorbing gear mechanism 840. Then, the driving force is transmitted to the gear 862 via the gear 866, and inertia is absorbed and the driving force acts to rotate the output shaft 14 at a low speed (Step S806). On the other hand, when the gear 862 rotates, the regenerative/backing up motor 864 also rotates, and so-called regenerative driving is also performed. Due to these operations, the output shaft 14 rapidly decreases in rotation speed, and goes from a forward rotating state into a rotation stopping state. That is, the drive shaft 12 is rapidly stopped due to actions of the inertia absorbing gear mechanism 840→the reversing high-load multiple disk clutch 850→the reversing mechanism 860 acting in this order. Then, when the vehicle speed sensor 304 detects that the vehicle speed has become equal to "0" (Yes in Step S808), as illustrated in FIG. 13, the ECU 872 drives the regenerative/backing up motor 864 (Step S810) and drives reversely the output shaft 14 for several seconds (Step S812), and then stops driving of the regenerative/backing up motor 864. For example, when the vehicle speed at the time of the collision is 50 km/h, the output shaft reverses for 5 seconds, and when the vehicle speed at the time of the collision is 40 km/h, the output shaft reverses for 4 seconds. At this time, as described above, setting is made so that reverse rotation of the regenerative/backing up motor 864 becomes a large torque by the gears 861 and 862 while its rotation speed is low, so that the output shaft 14 rotates reversely with a large torque. Accordingly, the automobile stops after backing up for several seconds (Step S814). Along with reverse driving of the regenerative/backing up motor 864, the reversing high-load multiple disk clutch 850 goes OFF.

Figure 14:
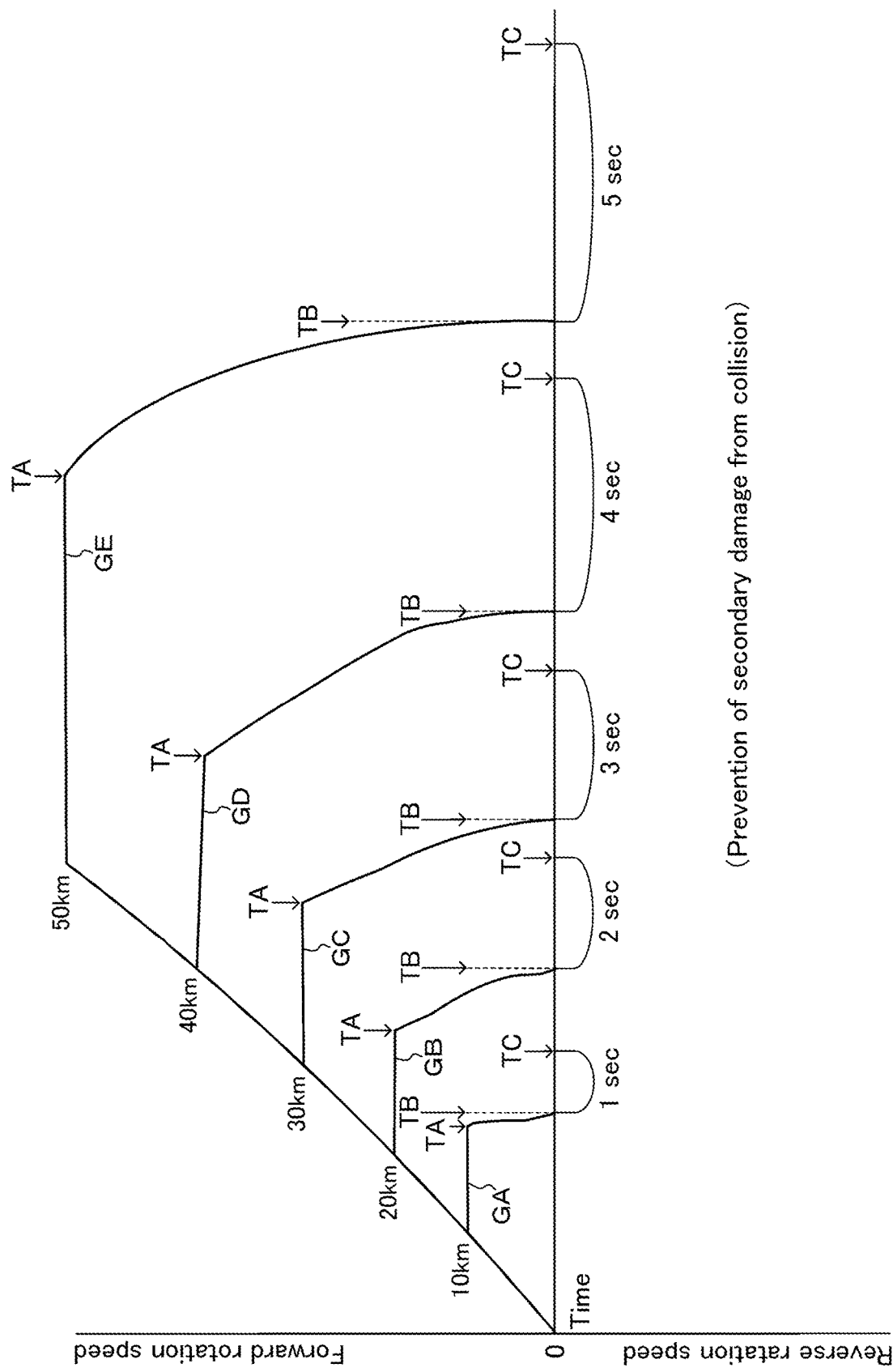
FIG. 14 is a diagram illustrating a running operation example in the Example 3.

FIG. 14 illustrates changes in vehicle speed when the collision mitigation mechanism 800 of the present example operates. Graphs GA to GE represent states of running at respective speeds of 10, 20, 30, 40, and 50 km/h, and on the assumption that a collision is detected at the time TA, rapid deceleration is performed and the vehicle speed reaches "0" at the time TB. Thereafter, the speed becomes negative and the automobile backs up, and the speed reaches "0" again at the time TC and the automobile stops. In the illustrated example, the automobile backs up for 1 second in the case of the speed of 10 km/h, backs up for 2 seconds in the case of the speed of 20 km/h, backs up for 3 seconds in the case of the speed of 30 km/h, backs up for 4 seconds in the case of the speed of 40 km/h, and backs up for 5 seconds in the case of the speed of 50 km/h.

As described above, according to the present example,
  a. When a collision is detected, the automobile is rapidly decelerated and stopped.
  b. After the stopping, the automobile is backed up.
  c. After backing up for several seconds, the automobile is stopped again.

Accordingly, the automobile is suddenly braked from the time point of the collision, and further slightly backed up and then stopped, and therefore, further expansion of the collision accident is reduced, and damage from the collision is mitigated.

Example 4

Figure 15:
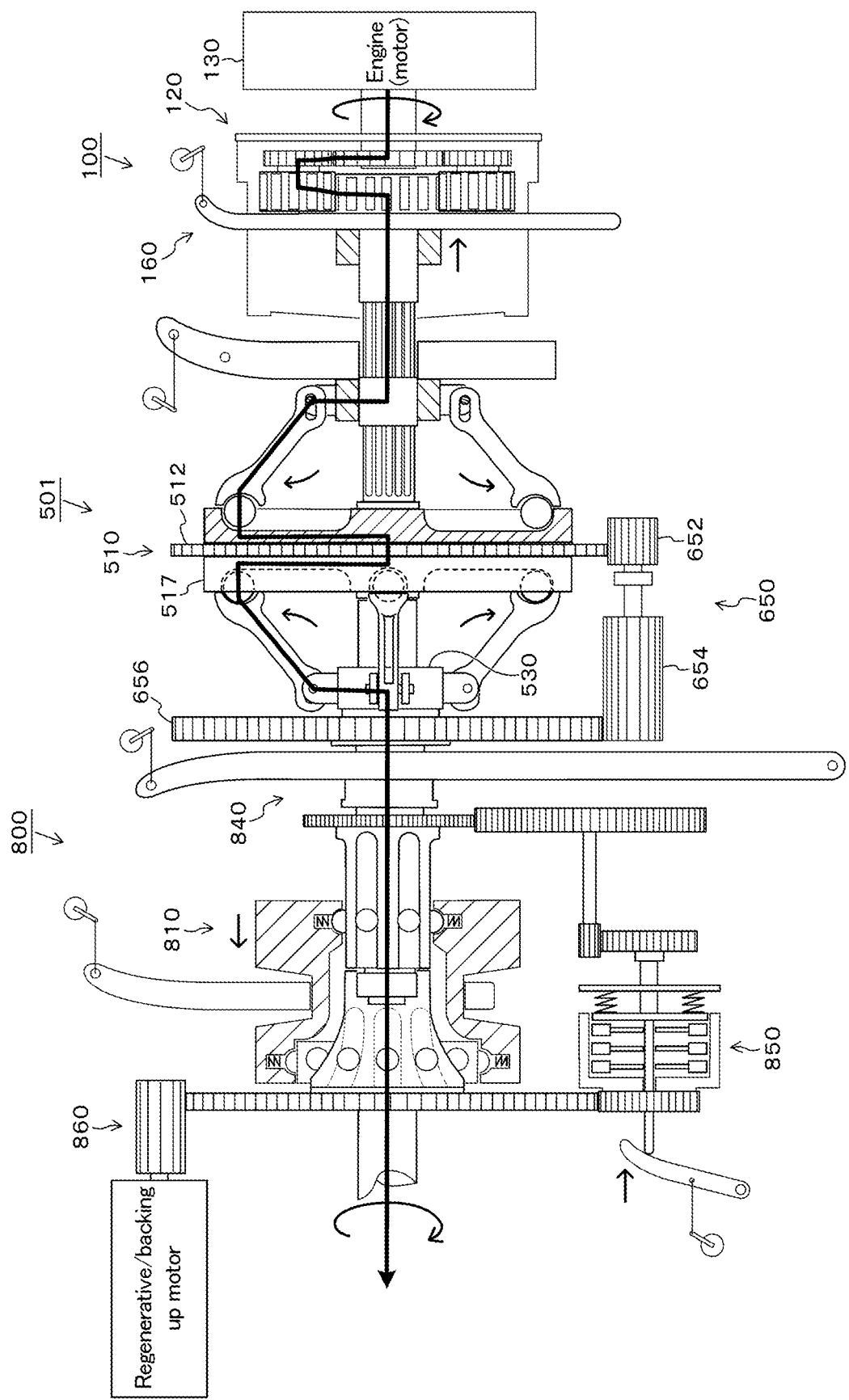
FIG. 15 is a view illustrating a state at the time of low speed/low-speed rotation in Example 4 of the present invention.

Next, Example 4 of the present invention will be described with reference to FIGS. 15 to 20. As illustrated in FIG. 15, in the present example, the above-described idle running mechanism 100, impact reducing mechanism 501, and collision mitigation mechanism 800 are provided. In the impact reducing mechanism 501, as compared with the example described above, a recessed portion 517 of the rotary disk 510 rotates independently of the rotation control gear 512, and a joining gear unit 650 is provided instead of the reverse driving unit 600. A primary-side gear 652 of the joining gear unit 650 is in mesh with the rotation control gear 512, and a secondary-side gear 654 is in mesh with a drive gear 656 provided on the sliding body 530. In addition, gear ratios of the gears 652 and 654 are set so that the drive gear 656 rotates at an increased speed as compared with the rotation control gear 512.

Figure 16:
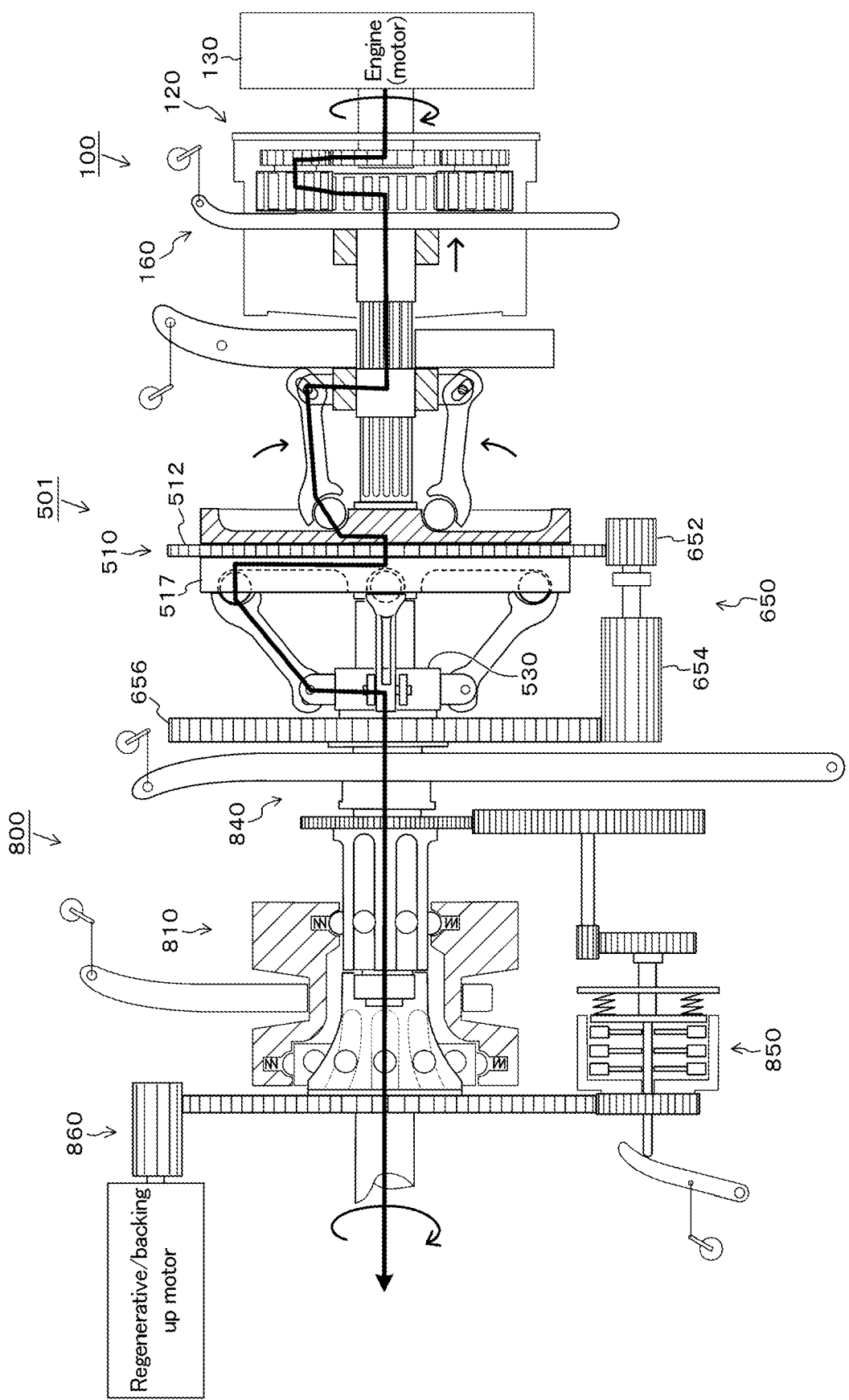
FIG. 16 is a view illustrating a state at the time of medium speed/medium-speed rotation in the Example 4.
Figure 17:
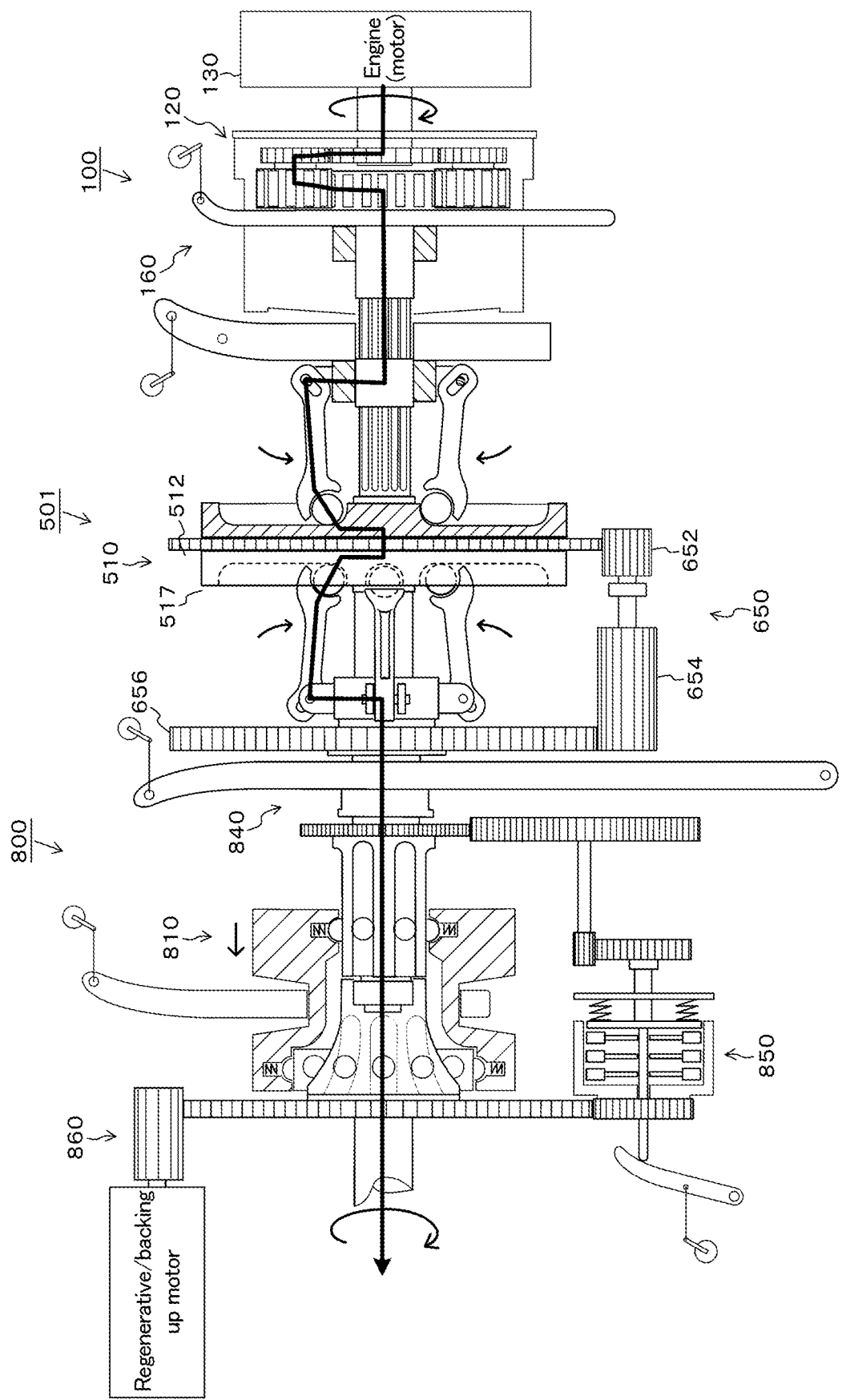
FIG. 17 is a view illustrating a state at the time of high-speed rotation in the Example 4.
Figure 18:
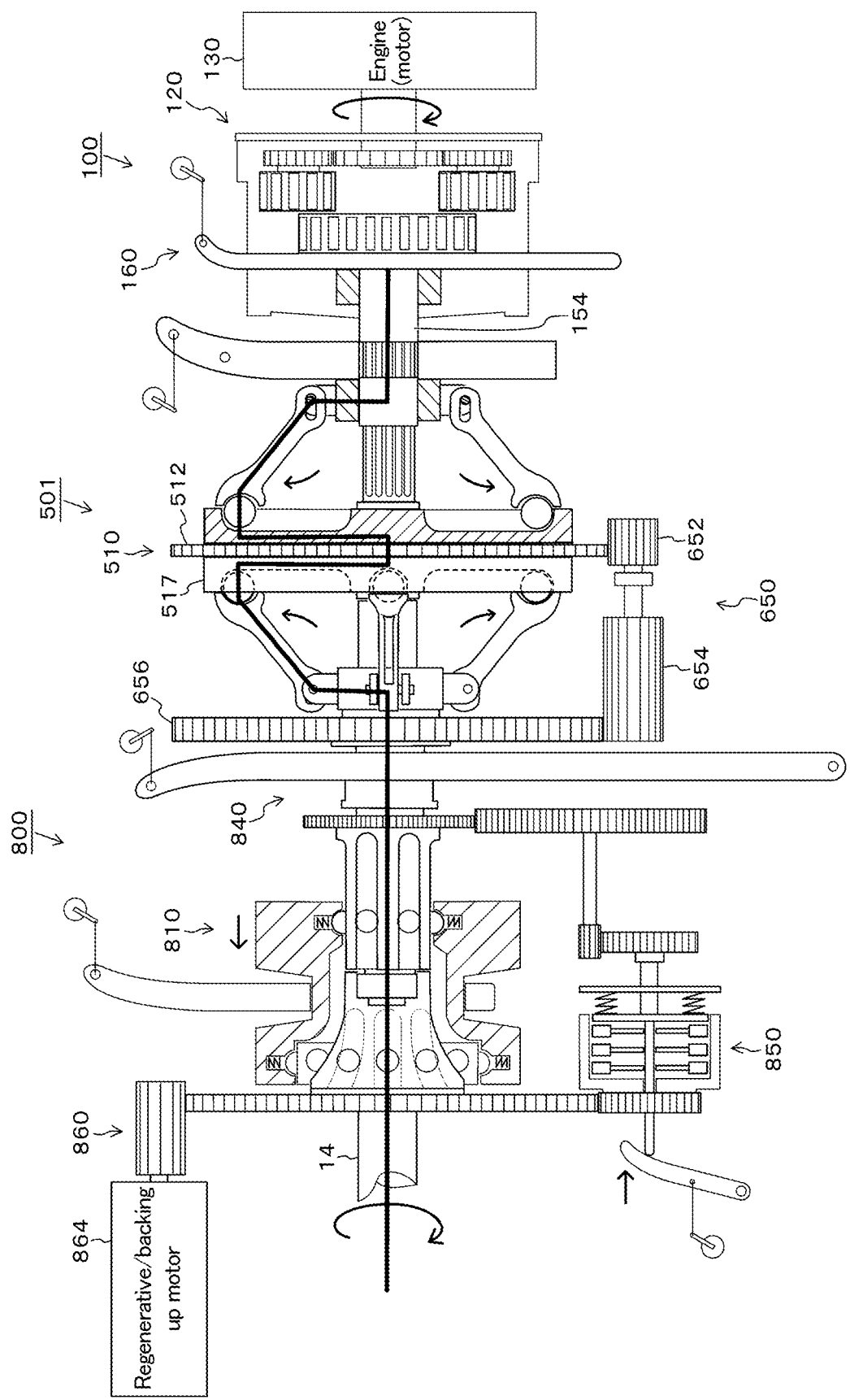
FIG. 18 is a view illustrating a state at the time of inertia/regeneration in the Example 4.
Figure 19:
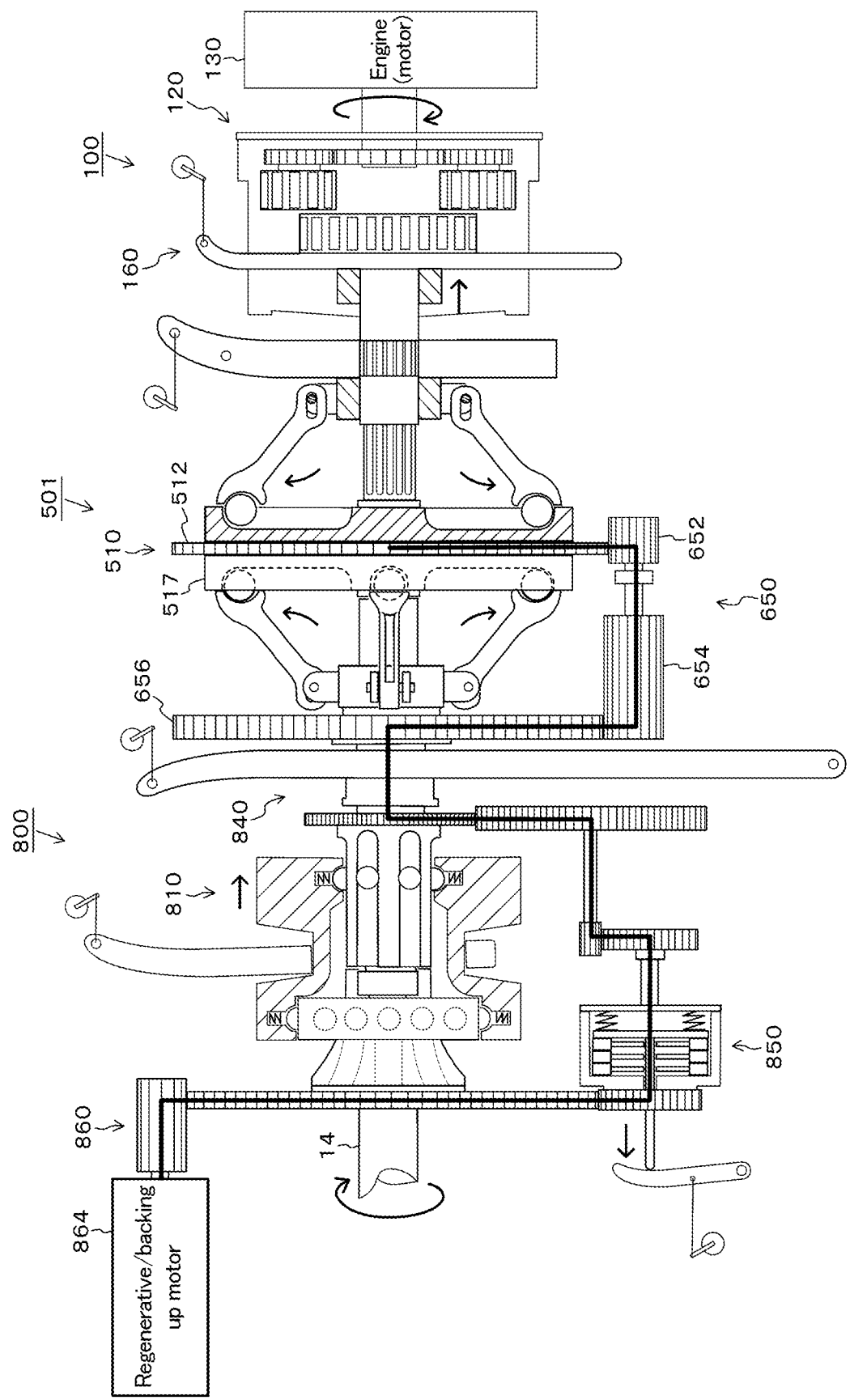
FIG. 19 is a view illustrating a state at the time of reversing/backing up in the Example 4.
Figure 20:
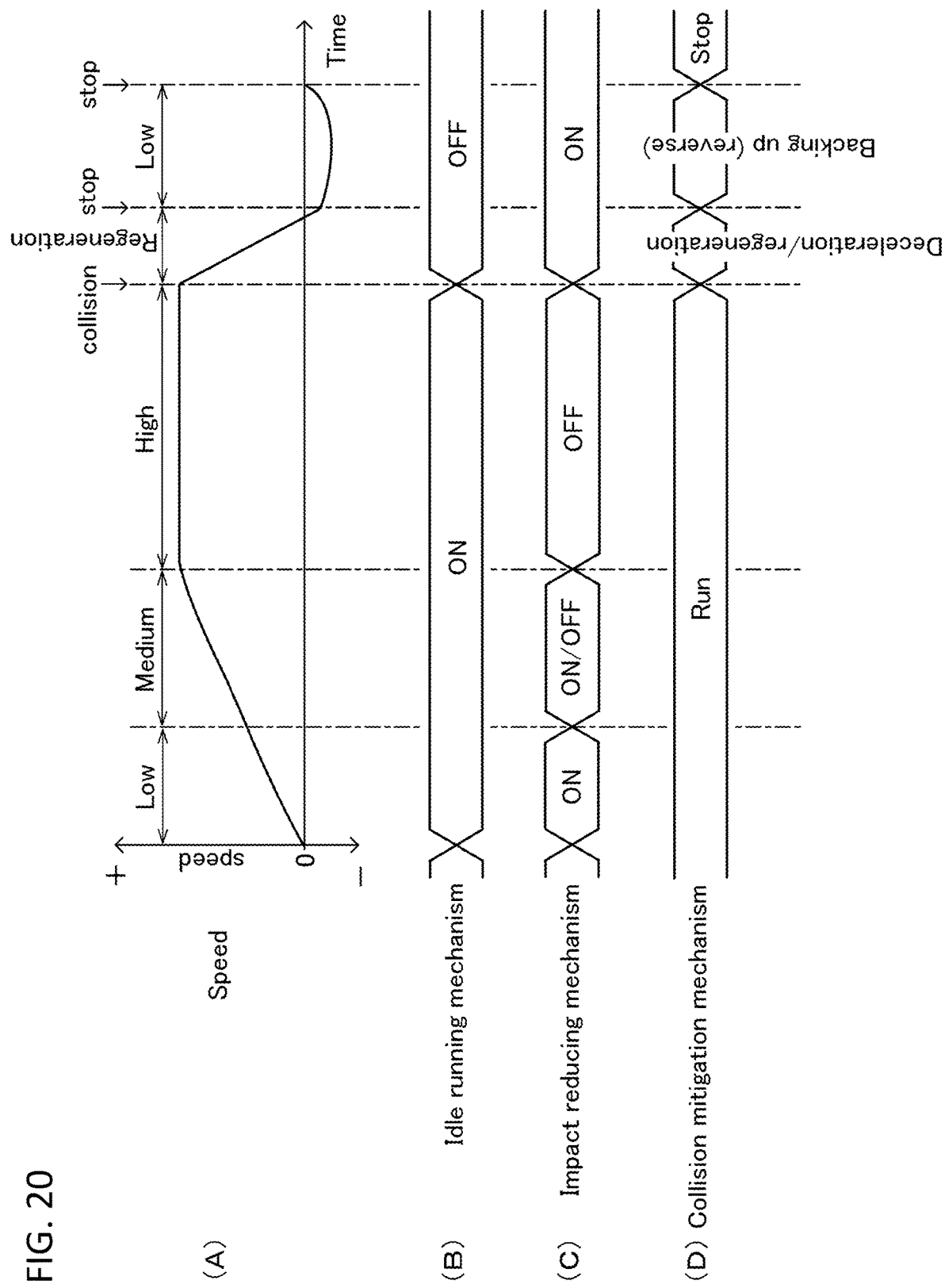
FIG. 20 is a diagram illustrating the entirety of an operation example of the Example 4.

Next, the entire operation of the present example will be described. FIG. 20 illustrates the entire operation. In FIGS. to 19 illustrating operation states, the thick line represents a driving force transmission path.
  (1) At the time of low speed, low-speed rotation with large torque: In this case, as illustrated in FIG. 15, the idle running mechanism 100 is ON, the impact reducing mechanism 501 is ON, and the collision mitigation mechanism 800 is in a running state. That is, running is performed in a state where an impact at the time of turning ON of the idle running mechanism 100 is reduced.
  (2) At the time of medium speed, medium-speed rotation: As illustrated in FIG. 16, the idle running mechanism 100 is ON, and in the impact reducing mechanism 501, the sliding body 530 slides due to action of the joining gear unit 650, the input side is ON and the output side is OFF, and the collision mitigation mechanism 800 is in a running state. That is, the state falls between FIG. 7(A) and FIG. 7(B), and acceleration is performed while the impact is mitigated.
  (3) At the time of high speed, high-speed rotation: As illustrated in FIG. 17, the idle running mechanism 100 is ON, the impact reducing mechanism 501 is OFF, and the collision mitigation mechanism 800 is in a running state.
  (4) At the time of inertia and regenerative power generation: As illustrated in FIG. 18, the idle running mechanism 100 is OFF, the impact reducing mechanism 501 is ON, and the collision mitigation mechanism 800 is in a regenerative operation state. That is, an impact of turning OFF of the idle running mechanism 100 is mitigated by the impact reducing mechanism 501. On the other hand, rotation of the driven shaft 154 is transmitted to the regenerative/backing up motor 864 and regeneration/power generation are performed, and the rotation speed of the output shaft 14 decreases and it stops with time.
  (5) At the time of reverse rotation for impact mitigation: As illustrated in FIG. 19, the idle running mechanism 100 is OFF, the impact reducing mechanism 501 is ON, and the collision mitigation mechanism 800 is in a reversing state. That is, the regenerative/backing up motor 864 starts to rotate, and the output shaft 14 rotates reversely. Since the impact reducing mechanism 501 is ON, an impact of the reverse rotation start is reduced. Then, after backing up by reversing for a certain period of time, the automobile stops.

In this way, according to the present example, the idle running mechanism 100, the impact reducing mechanism 501, and the collision mitigation mechanism 800 are connected, so that an impact at the time of collision mitigation can also be reduced.

The present invention is not limited to the examples described above, and can be variously modified without departing from the spirit of the present invention. For example, the present invention includes the following as well.

(1) As the magnets 112 of the outer rotors 110 and the magnets 152 of the inner rotor 150 shown in the examples described above, rare-earth magnets such as Nd—Fe—B (neodymium-iron-boron) magnets are preferable examples, however, various magnets may be used.

(2) Although the plurality of outer rotors 110 are provided around the inner rotor 150 in the examples described above, it is also possible that a cylindrical outer rotor 110 is formed, and inside the outer rotor, magnets are disposed. It can be arbitrarily determined which of the outer rotor 110 and the inner rotor 150 is connected to the engine 130 side.

(3) As the idle running control actuator 166 shown in the examples described above and other actuators, various publicly known techniques such as electric and hydraulic actuators may be used.

(4) The relationships between various switches and ON/OFF shown in the examples described above may be inversed. For example, in the example described above, the accelerator switch 302 goes ON when the accelerator pedal is stepped on, however, conversely, even in the case where the accelerator switch 302 is turned OFF when the accelerator pedal is stepped on, it is possible to detect whether the accelerator pedal is being stepped on. The same applies to other switches.

(5) In the examples described above, the idle running control program 322, etc., are provided in the ECU 320 that controls the entire operation of the automobile, however, a control device may be provided separately.

Figure 5:
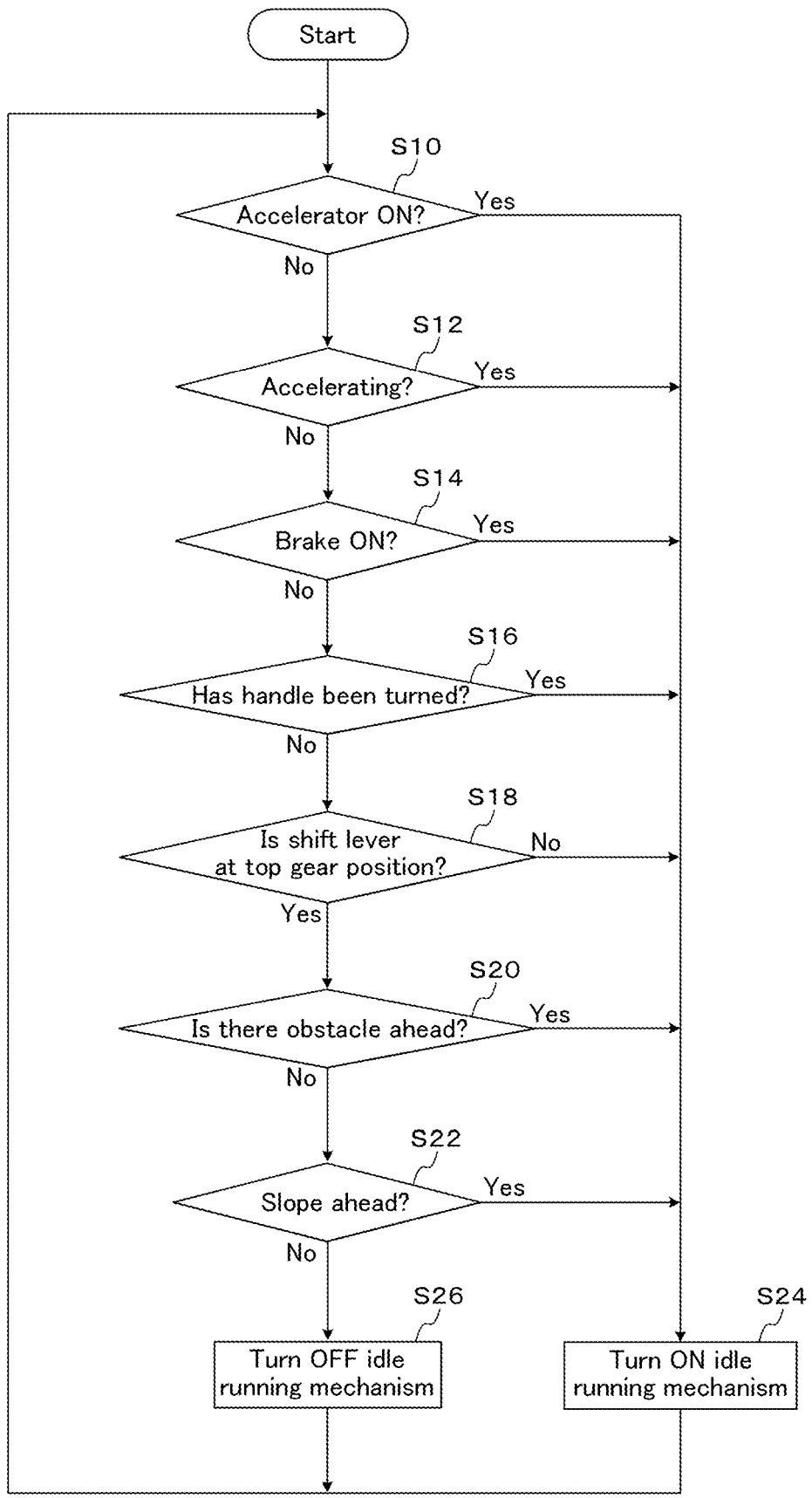
FIG. 5 is a flowchart illustrating an operation of an idle running control program of the Example 1.

(6) The flowchart illustrated in FIG. 5 is also an example, and various steps may be applied as long as it is possible to detect a situation where safe idle running is possible. For example, when a slope of a road is slight or the road is slightly curved, idle running is considered to pose no problem.

(7) The idle running mechanism, etc., of the present invention may be installed inside the clutch mechanism 200 or the transmission mechanism 202 that the automobile originally includes.

(8) In Example 3 or 4 described above, when the sliding direction (rightward in FIG. 10) of the sliding body 830 of the high-load ball clutch 810 matches an automobile running direction, this provides an advantage that the sliding body 830 easily slides and the high-load ball clutch 810 easily goes OFF at the time of a collision.

(9) In the examples described above, a collision is detected by the collision detection sensor 874, however, a collision may be detected by a front camera or an infrared sensor.

(10) It is also possible that a tilt and spin caused by an overturn of the vehicle at the time of a collision are detected by a gyro sensor, and an ABS (Antilock Brake System) brake is actuated.

(11) The present invention is preferably applied to an automobile by way of example, and is also applicable to various mobile objects such as trains, boats and ships.

INDUSTRIAL APPLICABILITY

According to the present invention, when a collision is detected, a rapid deceleration of a vehicle is performed, and backing up after stopping is performed and then stopping is performed. Therefore, further expansion of the collision accident is reduced, and the collision is mitigated. In addition, idle running is performed upon detection of a state where safe idle running is possible by the idle running mechanism, so that while the configuration is simple, effective use of energy, an improvement in fuel efficiency, and reduction in environmental load can be realized, and this is preferable for automobiles, etc.

The disclosure of Japanese Patent Application No. 2020-149490 filed on Sep. 4, 2020 is incorporated herein.

REFERENCE SIGNS LIST

12: Drive shaft
14: Output shaft
20: Clutch device
100: Idle running mechanism
110: Outer rotor
112, 152: Magnet
114: Rotary shaft
120: Gear mechanism
130: Engine
132: Drive shaft
134: Main gear
136: Driven gear
150: Inner rotor
154: Driven shaft
155: Output shaft
156: Frictional material
160: Sliding mechanism
162: Lever
164: Spring
166: Idle running control actuator
200: Clutch mechanism
202: Transmission mechanism
204: Axle
230: Motor
300: Idle running control device
302: Accelerator switch
304: Vehicle speed sensor
306: Brake switch
308: Handle steering angle sensor
310: Shift position switch
312: Front obstacle detection sensor
314: Road surface angle sensor
320: ECU
322: Idle running control program
500, 501: Impact reducing mechanism
510: Rotary disk 512: Rotation control gear
514, 516, 517: Recessed portion
520, 530: Sliding body
522, 532: Arm
522C, 532C: Pivot
524, 534: Roller
526, 536: Lever
600: Reverse driving unit
602: Reverse motor
604: Reverse clutch
606: Control drive gear
610: Accelerator lever
650: Joining gear unit
652, 654: Gear
656: Drive gear
700: Airbag sensor
702: Gyro sensor
704: Inter-vehicular distance radar
706: ABS actuator
722: Impact reducing program
800: Collision mitigation mechanism
810: High-load ball clutch
820: Driving force transmission ring
822: Input-side transmission ring
822A, 824A: Ball rail
824: Output-side transmission ring
830: Sliding body
832, 834: Annular ball holding portion
832A, 834A: Ball
832B, 834B: Spring
836: Collision mitigation lever
838: Ball clutch actuator
840: Inertia absorbing gear mechanism
842, 844: Gear
844A: Rotary shaft
846, 848: Gear
850: Reversing high-load multiple disk clutch
852: Reverse lever
854: Multiple disk clutch actuator
860: Reversing mechanism
861, 862: Gear
864: Regenerative/backing up motor
866: Gear
870: Collision mitigation control device
872: ECU
874: Collision detection sensor
876: Collision mitigation program

What is claimed is:

1. A collision mitigation mechanism for mitigating damage from a vehicle collision, comprising:
a collision detection means configured to detect a collision of a vehicle;
a clutch means configured to block transmission of a driving force of a drive source in response to a collision detected by the collision detection means;
a deceleration and stop means configured to decelerate and stop the vehicle in a state where the clutch means blocks transmission of the driving force of the drive source in response to a detection of the collision of the vehicle detected by the collision detection means;
a backing up means configured to back up and stop the vehicle after the vehicle is stopped by the deceleration and stop means in a state where the clutch means blocks transmission of the driving force of the drive source; and
a collision mitigation control means configured to, in response to the collision detected by the collision detection means, (1) decelerate and stop the vehicle travelling in a forward direction by the deceleration and stop means, and then, in response to a detection that the speed of the vehicle has become equal to zero, (2) back up the vehicle to travel for a several seconds in a reverse direction from a point of the collision and then stop the vehicle at a point reversely distanced from the point of the collision by the backing up means.

2. The collision mitigation mechanism according to claim 1, wherein the deceleration and stop means is a regeneration means configured to absorb inertia of the vehicle.

3. The collision mitigation mechanism according to claim 2, wherein the backing up means includes a motor means, and the regeneration means is configured by rotating reversely the motor means.

4. A clutch device to be used as the clutch means of the collision mitigation mechanism according to claim 1, comprising;
an idle running mechanism configured to turn ON and OFF transmission of power of an input side to an output side; and
an idle running control device configured to control the turning ON/OFF, wherein
the idle running mechanism comprises:
an output side rotor mechanism and an input side rotor mechanism located at inner side of the output side rotor mechanism;
a plurality of first magnets on a periphery of the output side rotor mechanism and a plurality of second magnets on outer periphery of the input side rotor mechanism, the plurality of first and second magnets being aligned to have alternate polarities N and S between the respective pair of the plurality of first and second magnets; and
a sliding means configured to
transmit rotation of the input-side rotor to the output-side rotor by a magnetic force generated between the magnets of the input-side rotor and the magnets of the output-side rotor in response to the turning ON of the idle running mechanism, and
slide at least one of the rotors so that no magnetic force is generated between the magnets of the input-side rotor and the magnets of the output-side rotor in response to the turning OFF of the idle running mechanism, and
the idle running control device comprising:
a sensor means configured to detect a running state of the vehicle and road conditions; and wherein
the idle running control means is configured to generate a corresponding idle running control signal to turn OFF the idle running mechanism in response to the deceleration of the vehicle while the vehicle is traveling straight on a flat road, based on detection results by the sensor means, and output the corresponding idle running control signal to the sliding means.

5. The clutch device according to claim 4, wherein the input side rotor mechanism is provided on an outer circumference of the output-side rotor mechanism, and a power transmission mechanism that transmits power of an input shaft into which power is input to the input side rotor mechanism, is provided.

6. The clutch device according to claim 4, wherein
the sensor means comprises at least one of:
an accelerator switch configured to detect whether an accelerator pedal has been stepped on;
a vehicle speed sensor configured to detect a vehicle speed;

a brake switch configured to detect whether a brake pedal has been stepped on;
a handle steering angle sensor configured to detect whether a handle has been turned;
a shift position switch configured to detect a position of a shift lever;
a front obstacle detection sensor configured to detect whether an obstacle is present ahead; and
a road surface angle sensor configured to detect a slope of a road surface.

7. The clutch device according to claim 4, further comprising:
a rotary disk attached to a driven shaft to be driven to rotate by the output-side rotor, the rotary disk including a front surface and a rear surface with respect to an axial direction of the driven shaft;
an output shaft engaging with the driven shaft;
a first sliding body on the front surface of the rotary disk and configured to slide in the axial direction of the driven shaft;
a second sliding body on the rear surface of the rotary disk and configured to slide in an axial direction of the output shaft;
a plurality of first arms extending from the first sliding body towards the front surface of the rotary disk and a plurality of second arms extending from the second sliding body towards the rear surface of the rotary disk, the plurality of first arms and second arms being swingable in a radial direction of the rotary disk; and
an impact reducing mechanism configured to move the plurality of first and second arms to an outer circumferential side of the rotary disk so that the plurality of first and second arms being pulled at outer periphery side of the rotary disk, in response to a switch of the idle running mechanism from ON to OFF.

8. The clutch device according to claim 7, further comprising a reverse driving means configured to stop rotation of the rotary disk in an emergency.

9. The clutch device according to claim 4, wherein
the output side rotor mechanism includes a plurality of output side rotors arranged around an outer periphery of the input side rotor mechanism, each of the plurality of output side rotors being configured to rotate around an axis of the respective one of the plurality of output side rotors, and the plurality of the first magnets are on an outer periphery of each of the plurality of input side rotors.

10. The clutch device according to claim 4, wherein
the output side rotor mechanism includes a cylindrical rotor, and
the plurality of the first magnets are on an inner periphery of the cylindrical rotor.

11. The collision mitigation mechanism according to claim 1, wherein
the collision mitigation control means is further configured to, in response to the collision detected by the collision detection means, decelerate and stop the vehicle by the deceleration and stop means, and then, in response to a detection that the speed of the vehicle has become equal to zero, back up the vehicle by a time depending on a vehicle speed at the time of the collision, and thereafter stop the vehicle.

* * * * *